United States Patent [19]

Kennedy

[11] Patent Number: 4,737,788
[45] Date of Patent: Apr. 12, 1988

[54] HELICOPTER OBSTACLE DETECTOR

[75] Inventor: Peter D. Kennedy, Mesa, Ariz.

[73] Assignee: Motorola, Inc., Schaumburg, Ill.

[21] Appl. No.: 719,854

[22] Filed: Apr. 4, 1985

[51] Int. Cl.⁴ ............................................. G01S 13/93
[52] U.S. Cl. ........................................ 342/29; 342/94; 342/159
[58] Field of Search ................ 343/5 R, 5 HE, 5 PD, 343/8, 9 R, 17.1 PF, 705, 708; 342/29, 5, 70, 158, 94, 146, 159

[56] References Cited

U.S. PATENT DOCUMENTS

| | | | |
|---|---|---|---|
| 2,677,819 | 5/1954 | Sinsheimer | 342/29 |
| 2,991,463 | 7/1961 | Lakatos et al. | 342/29 |
| 3,134,100 | 5/1964 | Lakatos | 342/29 |
| 3,139,617 | 6/1964 | Denman et al. | 343/5 HE X |
| 3,144,646 | 8/1964 | Breithaupt | 343/5 HE X |
| 3,389,393 | 6/1968 | Young, Jr. | 343/708 |
| 3,528,070 | 9/1970 | Young, Jr. | 342/158 X |
| 3,603,993 | 9/1971 | Follen | 343/6.5 LC |
| 3,611,376 | 10/1971 | Gutleber | 343/11 R |
| 4,038,656 | 7/1977 | Webb, Jr. et al. | 343/5 SA |
| 4,218,680 | 8/1980 | Kennedy | 343/6.8 R |
| 4,275,396 | 6/1981 | Jacomini | 343/5 SA |
| 4,308,536 | 12/1981 | Sims, Jr. et al. | 342/70 |
| 4,417,248 | 11/1983 | Mathews | 342/29 |
| 4,638,315 | 1/1987 | Raven | 342/5 |

FOREIGN PATENT DOCUMENTS

| | | | |
|---|---|---|---|
| 3328340 | 2/1985 | Fed. Rep. of Germany | 342/29 |
| 8501799 | 4/1985 | World Int. Prop. O. | 343/29 |

OTHER PUBLICATIONS

M. Skolnik, *Radar Handbook*, pp. 19-3; (McGraw-Hill, 1970).

Primary Examiner—Theodore M. Blum
Assistant Examiner—Bernarr Earl Gregory
Attorney, Agent, or Firm—Maurice J. Jones, Jr.; Eugene A. Parsons

[57] ABSTRACT

A pulsed Doppler radar mounted adjacent to the tip of a helicopter rotor blade for sensing obstacles in the helicopter path. The rotor tip velocity shifts the frequency of radar echos so that, through pulsed Doppler radar techniques, the echos from obstacles can be separated from clutter.

7 Claims, 11 Drawing Sheets

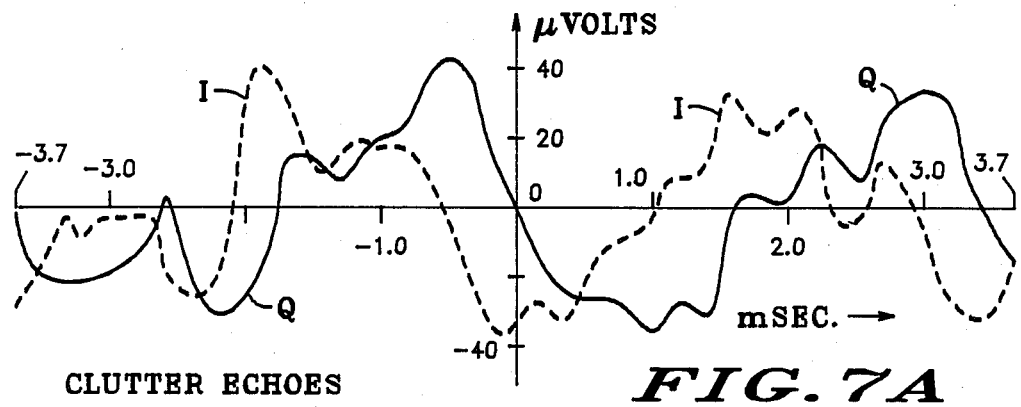
FIG. 7A — CLUTTER ECHOES
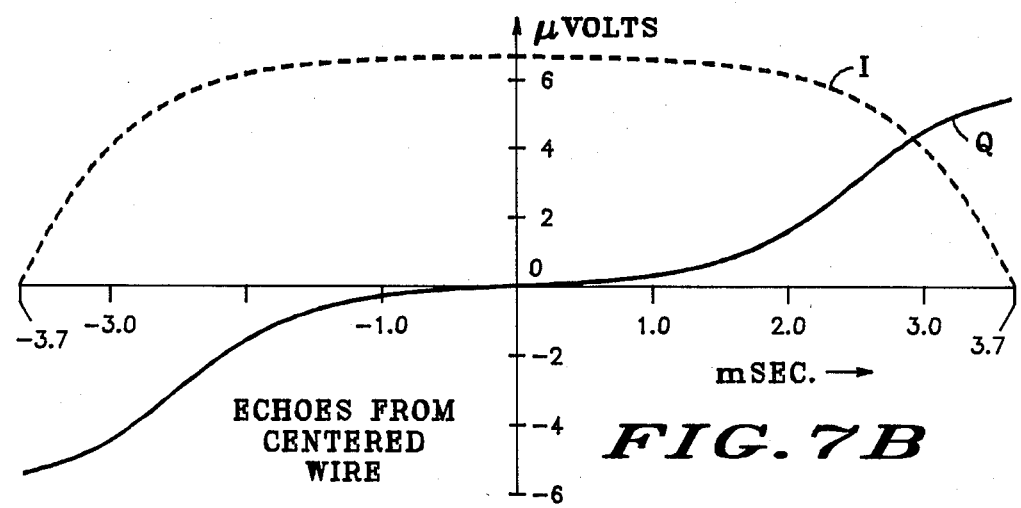
FIG. 7B — ECHOES FROM CENTERED WIRE
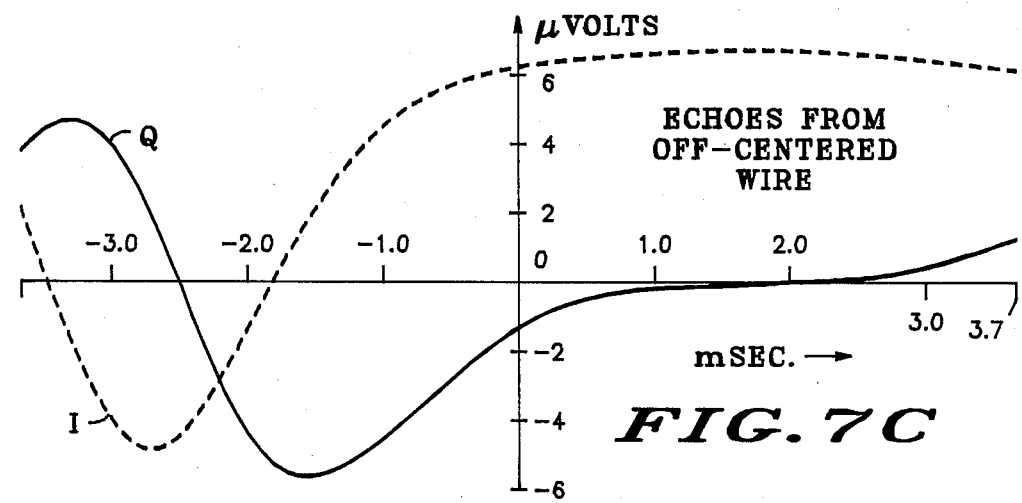
FIG. 7C — ECHOES FROM OFF-CENTERED WIRE

ROOT-SUM-SQUARING CIRCUIT EXAMPLE

SUBSTITUTION FOR DIGITAL REFERENCE GENERATOR 222 OF FIG. 10 FOR ALTERNATE SPEED COMPENSATION

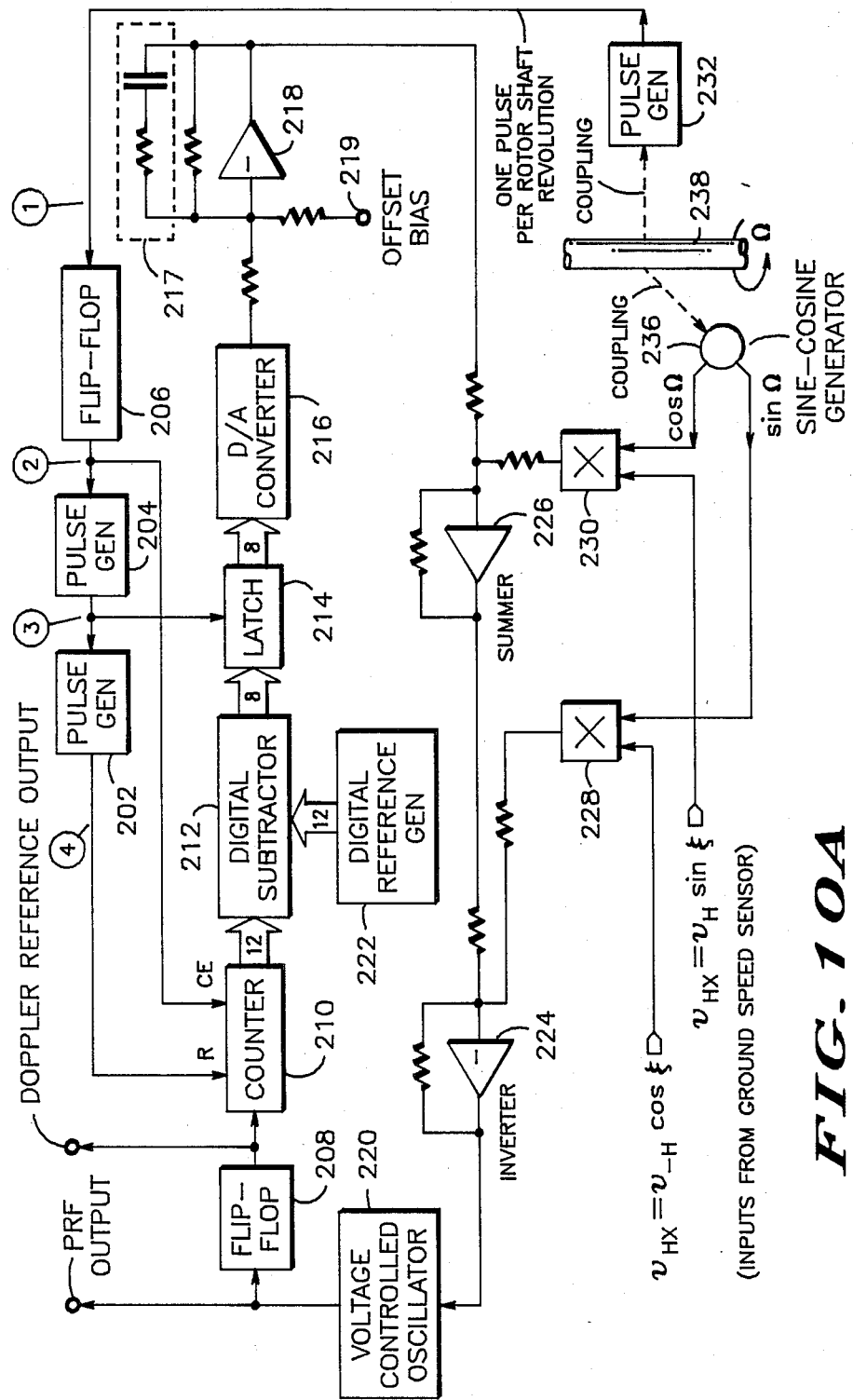
FIG. 10A DOPPLER REFERENCE WAVEFORM GENERATOR

WAVEFORMS FROM POINTS IN FIG. 10A

HELICOPTER OBSTACLE DETECTOR

BACKGROUND OF THE INVENTION

The present invention relates to the detection of obstacles to the horizontal flight of helicopters, and more particularly, to a pulsed doppler radar system whose antenna is mounted near the tip of a rotor blade and that processes the radar echos' Doppler shift produced by the tangential velocity of the blade tip antenna in such a way as to discriminate against echos arriving from above or below the rotation plane of the blades, thus achieving a synthetically narrowed antenna beam that enables the detection of small flight path obstacles in the presence of ground clutter from terrain objects below (or above) the helicopter.

The helicopter's capability for operation close to the ground and, with its hovering capability, operating in propinquity to obstructions such as buildings, trees, etc., is severely hampered under conditions of low visibility. In order to move safely in a horizontal plane, the pilot must be aware of all obstacles at his altitude. One of the most dangerous types of obstacle is horizontal wires. These are quite prevalent in civilized countries and are extremely difficult to see even under conditions of good visibility. A short range navigation aid is needed to indicate to the helicopter pilot the relative position of such obstacles and to alert him to a threatening situation.

Radar is, in many respects, an ideal sensor, with its ability to see through clouds and darkness and even to penetrate rainfall. However, distinguishing the echos from an object such as a horizontal wire in the presence of the reflections from large areas of terrain around the helicopter poses a difficult problem for the radar designer.

One approach to detecting obstacles in the flight plane is to discriminate against terrain echos on the basis of vertical antenna directivity, whereby echos from obstacles outside the flight plane are attenuated compared to those close to the flight plane. Unfortunately, directivity in simple radar systems requires large antenna apertures, which are heavy and not compatible with the aerodynamics of airborne vehicles. However, it is well known that a large synthetic aperture can be generated by processing signals received while a relatively small physical antenna is transported through space. This principle is exploited in some airborne radars in which special signal processors use the Doppler history of reflections from terrain objects imparted by aircraft motion to enhance the horizontal resolution of the physical antenna. However, these techniques fail when the airborne vehicle velocity approaches zero. Furthermore, these systems do not enhance resolution in the vertical plane, as required in this application.

The present invention achieves synthetic aperture generation by utilizing the tangential velocity of the tip of a helicopter rotor blade. Echos received by a transmit-receive antenna mounted thereon are Doppler shifted in frequency because of the rotor tip velocity, with the highest Doppler frequency shift being observed for objects that are in line with the tangential velocity vector. By using pulse Doppler radar techniques, it is possible to reject echos from objects that are not in line with the antenna's velocity vector to such an extent that the otherwise large ground clutter echos are reduced sufficiently that small echos from objects such as horizontal wires are detectable.

SUMMARY OF THE INVENTION

A primary objective of my invention is a helicopter radar system that, without requiring a large antenna, will detect obstacles in the flight plane of the helicopter while discriminating against ground echos. This is accomplished according to my invention by mounting a small antenna on or near a rotor blade tip so that its beam is directed horizontally and perpendicular to the rotor and then using the Doppler frequency shifts of receive signals to generate a synthetic "end-fire" antenna array that effectively provides the necessary directivity.

Another objective is a radar system that will accomplish the required detection of flight plane obstacles independently of the helicopter's speed of travel. This is accomplished by adjusting the synthetic end-fire array signal processing parameters to compensate for the net rotor tip tangential speed relative to stationary obstacles near the instantaneous tip tangential velocity vector.

Another objective of my invention is to enhance the detection of horizontal wires in the helicopter flight plane. Such wires generate only a weak radar echo, but are an important navigation hazard. This is accomplished according to my invention by employing horizontal polarization of the transmitted rf signal and by establishing a narrow band Doppler filter centered on the maximum Doppler shift generated by an object in the plane of rotation of the rotor tip mounted antenna at the instant the tangential velocity vector of the antenna is pointing exactly at the aforementioned target. Echos from wires are passed by this filter, while ground echoes, since they originate from reflectors displaced in angle from the tangential velocity vector, have Doppler shifts lower than the maximum value and thus are suppressed by the narrow band filter.

The following Specification describes in detail how such a filter is implemented and evaluates its performance in selectively detecting wire returns in the presence of the expected level of ground returns. While the description of the preferred embodiment is limited to the main rotor of a helicopter and, therefore, to detecting obstacles in the normal path of the helicopter's movements, it will be understood by those skilled in the art that the invention also applies to other rotary blades, such as the tail rotor of a helicopter and it could also be used to observe obstacles above or below the helicopter.

BRIEF DESCRIPTION OF THE DRAWINGS

FIGS. 7 (A-C) shows typical ground clutter and wire signals at points in the block diagram of FIG. 5; these waveforms were generated by computer simulation of the radar and the signal processor;

FIG. 10-B shows waveforms at four points in the block diagram of FIG. 10-A; and

DESCRIPTION OF THE PREFERRED EMBODIMENT

Referring to the figures in more detail, it is stressed that the particulars shown are by way of example and for purposes of illustrative discussion. In particular, the details of the figures are not to be taken as a limitation upon the scope of the invention, which is, rather, defined by the appended claims that form, along with the drawings, a part of this specification.

Figure 1:
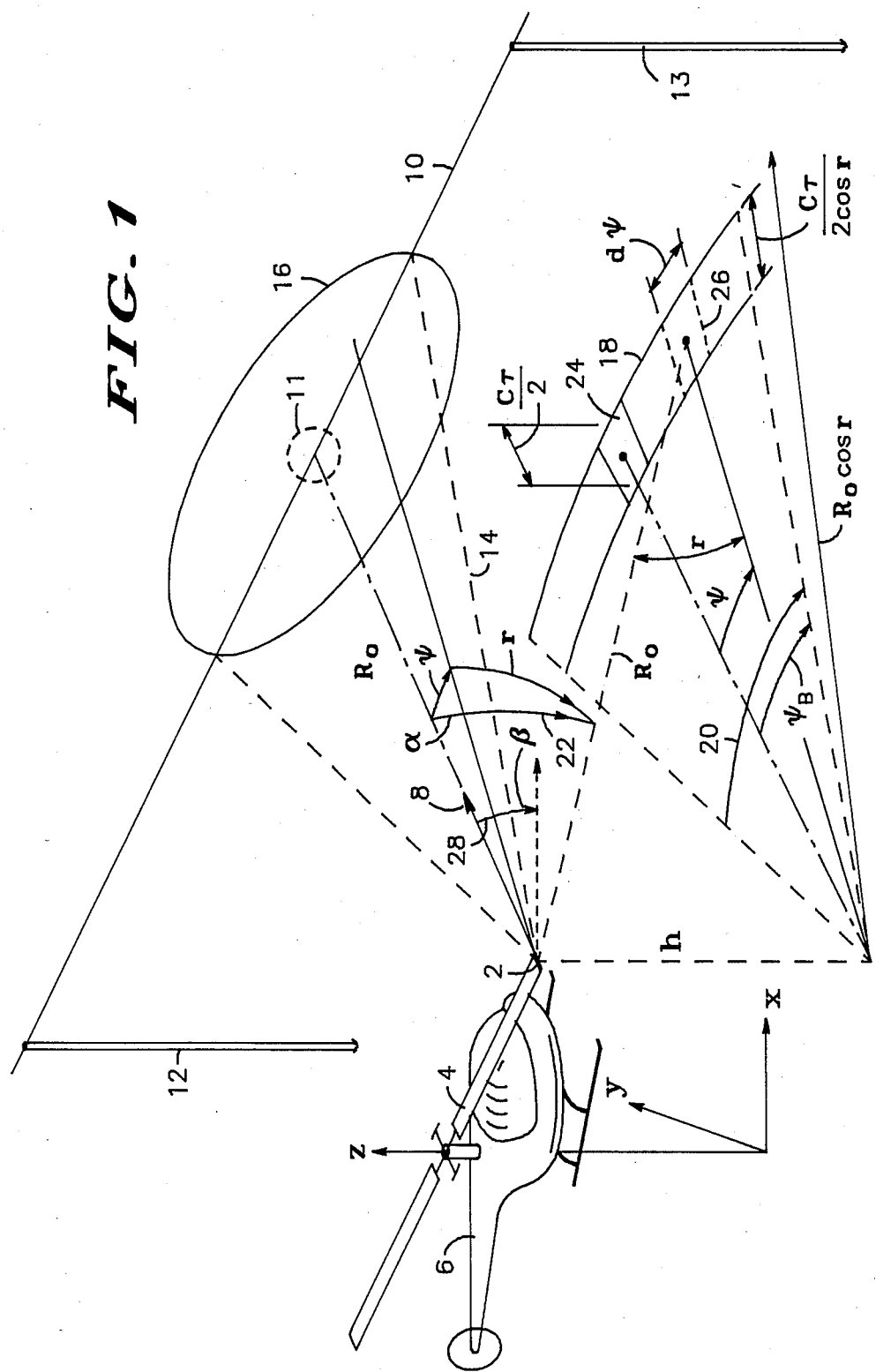
FIG. 1 is a perspective view of a helicopter embodying an example of the subject invention as it is being used to detect a flight hazard while discriminating against ground clutter echoes.

FIG. 1, in addition, has included a deliberate geometrical distortion, in that the distance from the helicopter to the obstacles to be detected has been greatly reduced, to ease interpretation and understanding of the essential geometrical relations among the objects depicted. Below, wherever this distortion could cause confusion, its consequences will be fully explained and allowed for.

FIG. 1 shows a pulse Doppler radar receive-transmit antenna, 2, mounted at the tip of a rotor blade, 4, of a helicopter, 6. Antenna 2 is depicted as a horn antenna for purposes of illustration; however, any antenna having suitable radiation characteristics could be employed, and in particular, an antenna with low aerodynamic drag qualities would be preferred, in practice. Furthermore, it is not necessary for the antenna to be mounted exactly at the tip of the rotor blade. The tangential velocity vector associated with the antenna due to rotation of the helicopter rotor is represented by an arrow 8. At the instant of time depicted, it is pointing towards a horizontal wire, 10, which, being at the same altitude as the helicopter rotor, constitutes a flight hazard or obstacle. To clarify the perspective relationships of the drawing, wire 10 is depicted as being suspended between two poles, 12 and 13. Antenna 2 has a major radiation pattern lobe, or beam, 14, that is directed in a plane perpendicular to rotor blade 4 and is thereby aimed in the same direction as the tangential velocity vector, 8. It naturally maintains this relationship as the rotor rotates. The antenna beam is shaped to be relatively narrow in the vertical direction and somewhat broader in the horizontal direction, as implied by beam cross-section, 16. Vertical beamwidth is required only to accommodate pitch attitude variations of the rotor blade, 4; otherwise it should be minimized to minimize ground clutter returns. Sufficient horizontal beamwidth is required to provide adequate obstacle radar echo strength during the signal processing interval in spite of the continual rotation of the helicopter rotor system. Of course, it must be understood that beam 14 and cross-section 16 are merely representations of the locus of directions of a particular constant response of antenna 2 relative to its response in the direction of its maximum response. The various directions towards which some power is radiated by the antenna and from which it can receive signals to some degree are not limited to this depicted beam.

A sectoral zone, or clutter patch, 18, marks the area on the ground that includes all objects whose radar echoes can arrive at the radar receiver simultaneously with radar echos from wire 10, tending to cause interference. The location of clutter patch, 18, is determined as follows:

For illustrative purposes, and as mentioned earlier, the radar set associated with antenna 2 is taken to be a pulsed Doppler radar. It is well known in radar systems analysis to employ, as an analytical tool, an imaginary "range cell" to determine the ranges of all objects whose echoes can overlap in the radar receiver input at a particular instant of time. The range cell is confined between two spheres concentric with the radiation center of the radar's transmit-receive antenna. Since the time delay between the transmitted signal and the arrival of a given reflected signal back at the receiver is related to two-way travel along the line of sight, the thickness of a range cell is given by $(C*T)/2$, where C is the velocity of light and T is the duration of the transmitted pulse.

As this fictitious range cell propagates through space, the returns from all objects enclosed in the spherical shell are actually overlapping at the receiver. The ground clutter patch, 18, is defined in range by the intersection of the range cell with the terrain underneath the helicopter. The nominal range from antenna 2 to clutter patch 18 is, of course, the same as the range from antenna 2 to wire 10. This range is denoted in FIG. 1 by $R_o$. Of course, the intersection of the range cell shell with the ground (assumed to be planar) would be the entire area between two concentric circles. However, echos from directions where the antenna response is relatively weak are negligible compared to those from the region of the circular zone in the direction of antenna beam 14. Thus it suffices to consider ground reflections from only those objects within an arc, 20, of size CT/2.

Although clutter patch 18 appears in FIG. 1 to be entirely outside antenna beam 14, it must be remembered that antenna 14 defines only a particular cone of relatively intense antenna response. Furthermore, for obstacles at a larger and more practical range than depicted in FIG. 1, antenna beam 14 will actually include clutter patch 18. Accordingly, objects within it can contribute significant interference, to the pulse echos from wire 10. It is the purpose of this invention to discriminate against the echos from ground objects in clutter patch 18 in favor of the echos from wire 10. Orienting the antenna beam 14 along velocity vector 8 and applying frequency selective filtering provides the needed discrimination, as described below.

The enhanced directivity due to signal processing is realized because reflecting objects in interference patch 18 are not coaxial with the tangential velocity vector, 8, but instead, are offset from it by an angle 22, denoted by α. If the Doppler shift of the echo from wire 10 has a given value at the depicted instant of FIG. 1, that from an object in interference patch 18 is reduced by the factor cos α.

It will be appreciated that, at a given instant of time, α varies for objects at various locations in interference patch 18. A central region, 24, has the smallest value of α, while other regions, of which region 26 is an example, displaced at an angle Ψ from the central region, have a larger value of α associated with them, and accordingly, a smaller Doppler shift.

Not only wires, but other elevated objects, such as tree tops, buildings, etc. constitute flight hazards. One such object is represented by sphere 11, colocated (at the instant of time depicted in FIG. 1) with the center of the apparent reflecting region of wire 10. As will be shown below, the apparent reflecting point of wire 10 slides along wire 10 as helicopter 6 travels towards the wire on a non-perpendicular path, as depicted in FIG. 1. At the instant shown, both the reflecting sphere and wire appear to be at a bearing angle 28, symbol β, from the helicopter's longitudinal axis. However, as the helicopter advances towards the intersection point of its flight path with the wire, the reflecting point on the wire will apparently remain at the same angle depicted, β, while the reflection from sphere 11 will increase in bearing, appearing at 90 degrees to the left as the helicopter passes by it. The wire reflection, while staying at a constant bearing, will decrease in range, the observed range being always the critical range to the nearest point of the wire, rather than to the intersection point of the wire and flight path. This motion of the reflection point along the wire has negligible effects on the optimum signal processing, as will be shown below in the analysis.

To illustrate the discrimination against ground clutter echoes afforded by the subject invention, a mathematical description of the Doppler frequency history of the echo from a wire located in the rotation plane of the helicopter rotor will be derived. Also will be derived the Doppler history of an echo from an element of the clutter patch.

Figure 2:
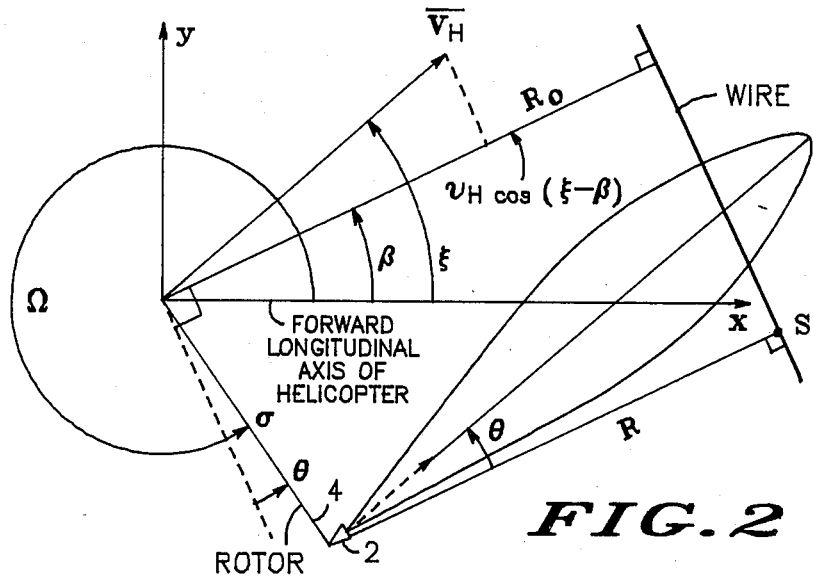
FIG. 2 is a plan view illustrating the geometry useful in determining the variation with time of the Doppler shift of the wire radar echo.

FIG. 2 shows the antenna at the tip of one of the helicopter's rotor blades, as well as the wire that it is desired to detect. X and Y axes are included and are located with their origin at the center of rotation of the helicopter rotor and with the X axis pointing in the direction of the forward axis of the helicopter. The rotor blade length, b, is taken to be 9 meters for illustrative purposes. The pulse Doppler radar transmit-receive antenna 2 is mounted at the tip of the rotor blade 4 as shown in FIG. 2. The tangential velocity vector is perpendicular to he rotor blade and the antenna beam is directed along it. At the instant depicted, the antenna beam is pointed at an angle, θ, from the line of sight from the antenna to the apparent reflecting point, s, of the wire. The rotor blade angle, Ω, from the X axis, is given by:

$$\Omega = \beta + \frac{3\pi}{2} + \theta \qquad \text{Equation (1)}$$

The helicopter's ground velocity vector, $V_H$, makes a heading angle, ξ with the forward axis of the helicopter; its component in the direction of the wire is $V_H \cos(\xi - B)$, as shown.

The assertion that the apparent reflecting point of the wire appears to be at the point, s, where wavefronts from the antenna are parallel to the wire will now be justified. Passing wavefronts induce in each element of length along the wire a current in phase with the instantaneous magnetic field strength at the wire. Near point s, the induced currents in adjacent elements are all in phase with each other owing to the parallelism of the wave fronts with the wire. At other points some distance from s, currents in adjacent elements of the wire have different phases, owing to the fact that the wavefronts are crossing the wire at an appreciable angles. As a consequence, an appreciable current flows in the wire near point s, while, at points remote from s, the induced currents tend to cancel each other, resulting in negligible net current flow. As the large currents flow away from point s, they are strongly attenuated by radiation. As a result, the reflecting point of the wire appears to be at point s.

It is evident from FIG. 2 that the instantaneous distance from point s to the antenna is R, given by:

$$R = R_o - b \sin \theta \qquad \text{Equation (2)}$$

The rotation rate of the rotor, in radians per second, is given by $V_{t/b}$, where $V_t$ is the magnitude of the tangential velocity vector of the antenna, b being the blade's length, or more strictly, the radius of rotation of the antenna's radiation center. For high aerodynamic efficiency, the magnitude of the tangential velocity vector, or the rotor tip speed, is usually designed to be close to he speed of sound, or 335 meters per second at sea level, and is herein so assumed. Thus, for a representative rotor blade length of 9 meters, the rotation rate is 37.2 radians per second, corresponding to about 6 revolutions per second for the rotor. Taking the time, t, to be to when the rotor blade is parallel to the wire, the instantaneous range as a function of time is given by:

$$R(t) = R_o(t) - b \sin \theta(t) \qquad \text{Equation (3)}$$

where $\theta = (V_{t/b})(t - t_o)$

As is well known, when the distance between a radar antenna and a reflecting object is varying with time, a Doppler frequency shift between the transmitted and received carrier frequencies is produced. The Doppler shift can be calculated as the decrease per unit time of the phase lag produced by the round-trip propagation delay, or:

$$W_d(t) = \frac{4\pi}{\lambda_o} (V_H \cos(\xi - \beta) + V_T \cos\theta(t)) \qquad \text{Equation (4)}$$

where $\lambda_o$ is the wavelength of the r-f carrier of the radar.

In addition to the frequency modulation implied by the varying Doppler shift, echo returns will also be amplitude modulated as the antenna beam sweeps over the wire's apparent reflecting point, s. With an assumed horizontal −3 dB one-way antenna beamwidth of $2\Psi_B$, the duration of the time interval, delta tB, during which the echo returns will be above a level that is 6 db less than their maximum level is given by:

$$\Delta t_B = 2(b/V_r)\Psi_B \qquad \text{Equation (5)}$$

This yields the duration in seconds for the time interval defined above when $\Psi_B$ is measured in radians.

However, a more important interval is that during which the Doppler frequency remains close enough to a constant value to be suitable for filtering by a narrow-band filter. Near $t_o$, the cosine term in Eqn. (4) varies slowly, but the Doppler frequency is offset by a term proportional to the component of the helicopter's velocity in the direction of the wire. This can be eliminated by mixing the Doppler signal with a suitable Doppler reference signal, as described below. Once this is accomplished, to estimate the interval in question, the phase difference between the Doppler signal and the Doppler reference sine-wave (whose frequency equals the value given by Eqn. (4) at $t=0$) can be used as a criterion.

The required frequency for the Doppler reference signal is a function of the indeterminate bearing, $\beta$ of the wire. However, at $t_o$, the antenna beam is pointing at the wire reflection point, so the rotor shaft can provide information about the angle, $\beta$. According to my invention, I set the radian frequency, $R(t)$, of the Doppler reference signal to:

$$W_R(t) = \frac{4\pi}{\lambda_o}(V_H \sin(\xi - \Omega(t)) + V_T) \qquad \text{Equation (6)}$$

Expressing $\Psi(t)$ in terms of $\beta$, this becomes:

$$W_R(t) = \frac{4\pi}{\lambda_o}(V_H \cos(\xi - \beta - \theta(t)) + V_T) \qquad \text{Equation (7)}$$

Now, at $t_o$:

$$W_R(t_o) = \frac{4\pi}{\lambda_o}(V_H \cos(\xi - \beta) + V_T) \qquad \text{Equation (8)}$$

since at $t_o$, $\theta$ equals 0. This is the same as the frequency of the Doppler signal at $t_o$. Substracting the reference signal frequency from the Doppler signal frequency by mixing will result in a difference frequency near 0 Hz at times near $t_o$; that frequency will be the frequency of the aforementioned tuned filter.

Comparing Eqn. (7) with Eqn. (4), it is apparent that the reference and Doppler frequencies deviate from each other at times other than $t_o$. To evaluate the effect of this deviation, the phase difference of the two sine-waves for times near $t_o$ must be calculated as the difference between the integrals of the two frequencies over the range $t_o$ to $t$. The wire's Doppler signal phase is:

$$\Phi_W = \frac{4\pi}{\lambda_o}(V_H(t - t_o)\cos(\xi - \beta) + b\sin\theta(t)) \qquad \text{Equation (9)}$$

The phase of the reference signal is:

$$\Phi_R = \frac{4\pi}{\lambda_o}\left\{ \frac{V_H b}{V_T}[\cos(\xi - \beta)\sin\theta(t) + \sin(\xi - \beta)(1 - \cos\theta(t)] + V_T(t - t_o) \right\} \qquad \text{Equation (10)}$$

The resultant phase difference, or wire signal phase error, is:

$$\Phi_{EW} = 4\pi \left\{ \left(1 - \frac{V_H}{V_T}\cos(\xi - \beta)\right)\left(\frac{b}{\lambda_o}\sin\theta(t) - \frac{V_T}{\lambda_o}(t - t_o)\right) - \frac{V_H b}{V_T \lambda_o}\sin(\xi - \beta)(1 - \cos\theta(t)) \right\} \qquad \text{Equation (11)}$$

This equation assumes the reference and Doppler signals are in-phase at $t_o$. This will not be true in general; the assumption will be allowed for, in the implementation described below.

Taking into consideration the way a narrow-band tuned single pole filter responds to a suddenly applied sine wave close to its resonant frequency, it is intuitively obvious that the optimum duration of time over which the echo signal should be applied corresponds to that duration over which the phase error, $\Phi_{EW}$, remains less than $\pi/2$ in magnitude. For example, should the phase error approach pi, the applied excitation would be out of phase with the building-up.

Figure 3:
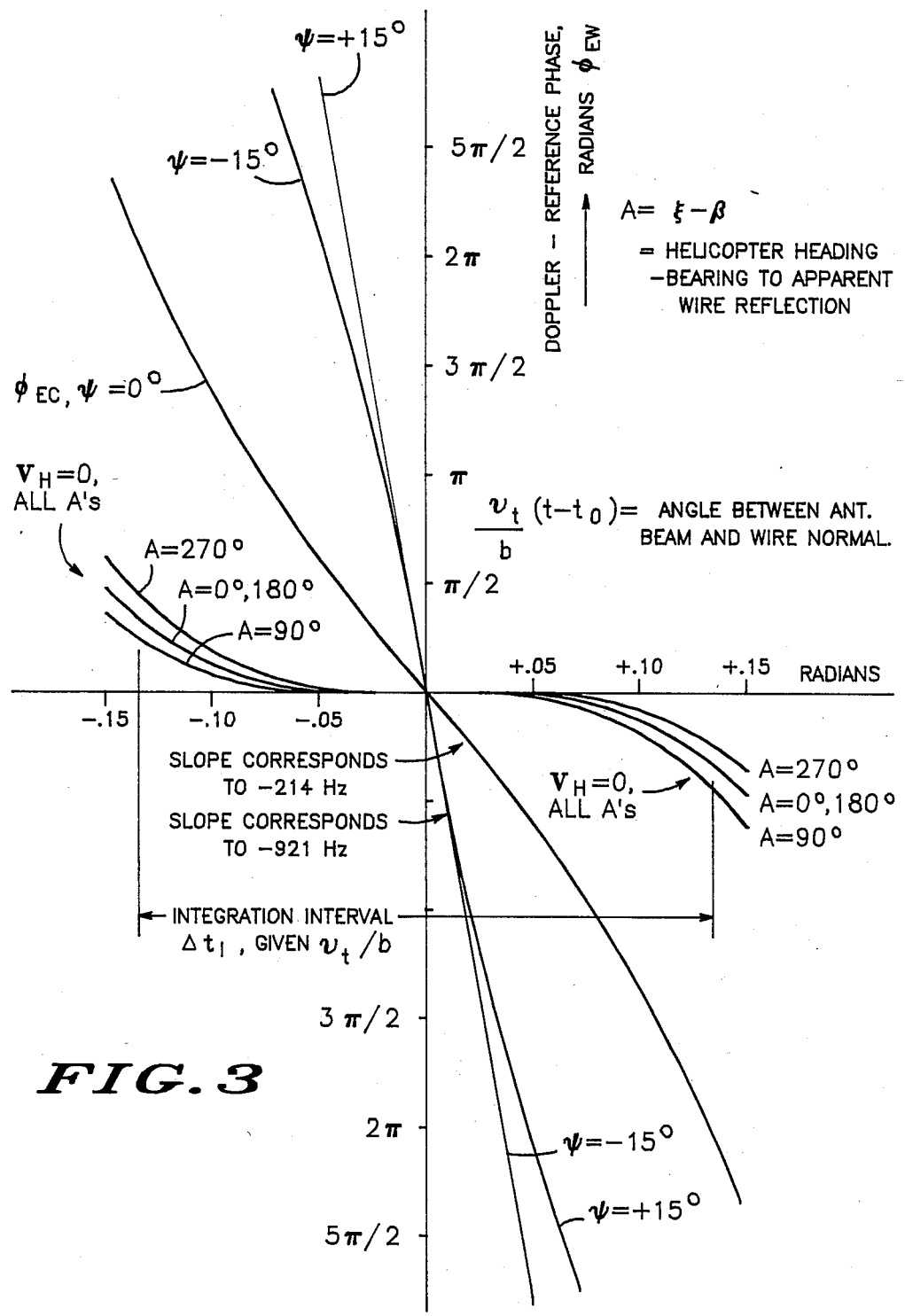
FIG. 3 shows the phase history of the Doppler shift of the wire echo as a function of time, and also the phase history of the Doppler shift from ground scatterers located in the center and at the edge of the radar antenna pattern as it is projected on the ground.

FIG. 3 shows how $\Phi_{EW}$ varies with $\theta$ for zero ground speed, and for a ground speed of 10 miles per hour, or 4.47 meters per second, with differences between helicopter heading and wire bearing of 0, 90, 180, and 270 degrees. The $\pi/2$ limits are drawn and it can be seen that for the cases of zero ground speed, and, by inference, for the cases of heading/bearing differences of 0 and 180 degrees at any ground speed, they correspond to $\theta$ equal to about $\pm 0.137$ radians, or 7.9 degrees.

At the 90 and 270 degree heading/bearing differences, the angular extent over which the phase difference remains less than $\pi/2$ in magnitude is about the same; the center of the region is merely shifted away from zero. This is of no consequence, since it merely means that the antenna pattern will not be exactly at peak at $t_o$. The signal processor described below must allow for much larger displacements. Accordingly, in the analysis that follows, only the case of helicopter ground speed equal to zero will be considered.

A more precise determination of the values of $\theta$ corresponding to phase differences of $\pm \pi/2$ can be obtained by iterative solution of Eqn. (4) with $V_H = 0$; the result is $$\theta_f = \pm 0.139 \text{ radians.} \qquad \text{Equation (12)}$$

With the assumed values of $V_t$ and b, the total corresponding time limit for filtering becomes:

$$\Delta t_f = 2\theta_f(b/V_T) = 0.00745 \text{ seconds.} \qquad \text{Equation (13)}$$

Comparing eqn. (12) and (5), it is seen that $\Psi_B$ must exceed 0.139 radians, or 7.95 degrees in order to maintain echo strength during the optimum processing interval. This would correspond to a full antenna horizontal beamwidth of about 16 degrees. The beamwidth of 30 degrees referred to in the discussion of FIG. 1 provides extra "coverage" that permits the implementation of a narrow band filter by overlapping integrate and dump processors, as described hereinafter.

According to Eqn. (13), the filtering or integration interval, $\Delta t_f$, equals 7.45 milliseconds. A single pole filter having a time constant of 7.45 milliseconds would have a $-3$ dB bandwidth of 42.7 Hz. Evaluating Eqn.

(4) at t=0 leads to a center frequency for the filter of 20,937.5 kHz.

If the filter center frequency is translated to zero by mixing the Doppler signal with a reference frequency, this implies that the reference frequency must match the maximum Doppler frequency to better than 21.3/20,937.5 or 0.1%. This implies the need for a means to adjust the Doppler reference frequency and the filter center frequency to accommodate variations in the rotor revolution rate. The implementation of such a means is described below.

Before describing the implementation of a filtering signal processor for the wire return echo, it is necessary to consider the average Doppler frequency history of a return from an element of area in the clutter patch and to calculate the resultant output of the filter when it is integrating the summed contribution of all such clutter elements. After this, a consideration of the filter response to the echo from a typical wire will demonstrate that the implementation can, indeed, detect a wire in the presence of the expected level of ground clutter radar returns.

Figure 4:
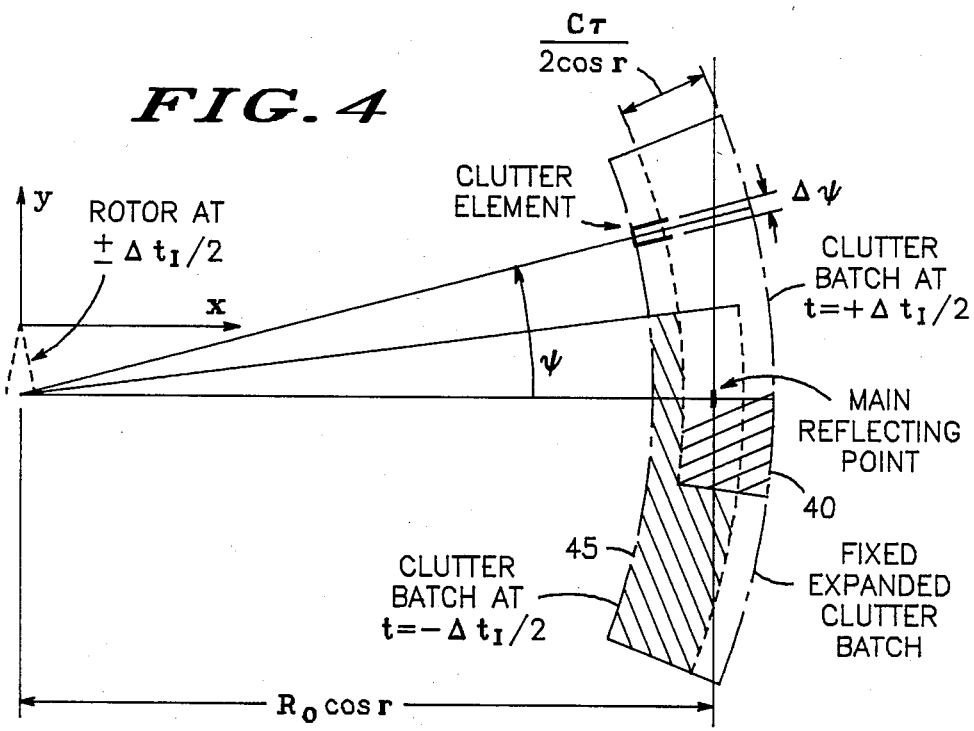
FIG. 4 is a plan view illustrating the geometry useful in detemining the amplitude and frequency spectrum of the echoes returned from ground-located objects.

FIG. 4 illustrates the geometry useful in considering echoes from objects on the ground, or ground clutter. The bearing of the wire is assumed to be 0 degrees. The figure is drawn to scale for detecting a wire at a range, $R_o$, of 70 meters from the helicopter rotor center. Two clutter patches 40 and 45 are shown, one, 40, corresponding to the instant of time at the beginning of the integration period and the other, 45, at its end. The geometry shown assumes a wire height, h, of 10 meters above the ground, the helicopter rotor being at the same height as the wire. The Cos $\gamma$, the depression angle from the horizontal plane containing the wire of the clutter-patch, is 0.99. The width of the clutter patch is taken as ($C\tau/2$ Cos $\gamma$). The radar pulse width is, for illustrative purposes, taken to be 0.05 microseconds, yielding a clutter patch width of 7.5 meters. Being somewhat less than the assumed rotor blade length of 9 meters, this will allow detection of objects sufficiently close to the helicopter for operational suitability.

The displacement of the two clutter patches 40 and 45 in FIG. 4 along the X axis arises because the antenna is offset 9 meters from the center of rotation, and during the integration period, the antenna moves approximately 2.65 meters in the Y direction.

The angular extent of each clutter patch 40 and 45 is shown as having an overall value of 30 degrees, corresponding to the antenna's horizontal beamwidth. As mentioned earlier, these angular limits of the clutter patches are shown merely for clarity. Actually, during the integration period, the contribution of each clutter element is multiplied by a time-varying antenna beam pattern factor that takes into account relative magnitude of the beam pattern, both within and outside of the limits shown in FIG. 4.

To simplify calculations, while conservatively allowing for the motion of the clutter patch during the integration period, the radial width of the clutter patch used in calculating clutter returns can be taken as $$\Delta R_c = (C\tau/2)/\cos\gamma + \Delta t_I V_T \quad \text{Equation (14)}$$

in which $\gamma$ equals the depression angle of the line of sight from the antenna to the patch, measured from the plane of rotation of the antenna.

The phase history of the echo return from a clutter element such as the one depicted in FIG. 4 will now be calculated. The element under consideration is taken to be offset by an angle $\Psi$ from a fixed reference line corresponding to the antenna beam center at the midpoint of the integration period. In analyzing the phase history, the angular width of the clutter element, $\Psi$, is temporarily taken as infinitesimal; later, $\Delta\Psi$ will be set at a value that aids in computing the clutter rejection property of the filter described below.

When the antenna beam is at an angle $\theta(t)$ from the X axis, the X, Y, Z coordinates of the clutter element and of the antenna are, from FIG. 4, as follows:

$$X_e = R_o \cos\gamma\cos\psi \quad X_a = b\sin\theta(t) \quad \text{Equation (15)}$$

$$Y_e = -b + R_o\cos\gamma\cos\psi \quad Y_a = -b\cos\theta(t)$$

$$Z_e = 0 \quad Z_a = h$$

Here the subscript "a" refers to the antenna while the subscript "e" refers to the clutter element.

From equations (15), the range from the antenna to the clutter element as a function of time is given by:

$$R_e(t) = \{(b\sin\theta(t) - R_o\cos\gamma\cos\Psi)^2 + (-b\cos\theta(t) + b - R_o\cos\gamma\sin\Psi)^2 + h^2\}^{\frac{1}{2}} \quad \text{Equation (16)}$$

After some manipulation, this range can be expressed in terms of the range to the wire, $R_o$, as:

$$R_e(t)/R_o = \{1 + 2(b/R_o)^2(1 - \cos\theta(t)) + \quad \text{Equation (17)}$$

$$2(b/R_o)\cos\gamma(\sin(\Psi - \theta(t)) - \sin\Psi)\}^{\frac{1}{2}}$$

An instantaneous average Doppler shift frequency, in radians per second, for the combined return from all scatterers in the clutter patch element can be obtained by differentiating $R_e$ after it has been converted to a phase lag in radians by multiplication by $4\pi/\lambda_o$. Then, for $v_h=0$, the phase difference between the Doppler reference signal and a sinewave having a frequency derived from equation (17) can be written as:

$$\Phi_{EC} = \frac{4\pi R_o}{\lambda_o}\left(1 - \frac{R_e(t)}{R_o}\right) - \frac{4\pi}{\lambda_o}V_T(t - t_o) \quad \text{Equation (18)}$$

Again, the two sine waves are assumed to be in-phase at $t_o$, when $R_e(t_o) = R_o$. The processor described below will take this assumption into account.

FIG. 3 includes a plot of $\Phi_{Ec}$ clutter elements located at three different values of $\Psi$: 0, and $\pm\Psi_B$, or, in this example, plus and minus 15 degrees, corresponding to the $-3$ dB one-way antenna beamwidth. The slope of the curves for $\Phi_{EC}$ at to correspond to frequencies of 214 Hz ($\Psi=0$) and 921 Hz ($\Psi=\pm\Psi_B$). As noted above, a single-pole filter with a time constant equal to $\Delta_I$ would have an overall $-3$ dB bandwidth of only 42.7 Hz. If the clutter elements' Doppler signals were steady state sinewaves, the signal from an element at $\Psi=0$ would be attenuated by 20 dB, while those from elements at the beam edges would be attenuated by 33 dB. This gives only a rough approximation of the degree of discrimination against clutter that a filtering processor might provide. A more accurate estimate is derived below; this will sum over all elements of the patch, weighting each element's contribution according to the antenna directivity pattern's value in the direction of the element.

A suitable filter requires an electronic implementation so that the filter's equivalent center frequency can be varied to correspond to the rotor rotation rate, which will not be constant. Similarly, equation (10) shows that the integration period should optimally be adjusted to compensate for rotor tip speed variations, though this will have only a minor effect on performance.

Figure 5:
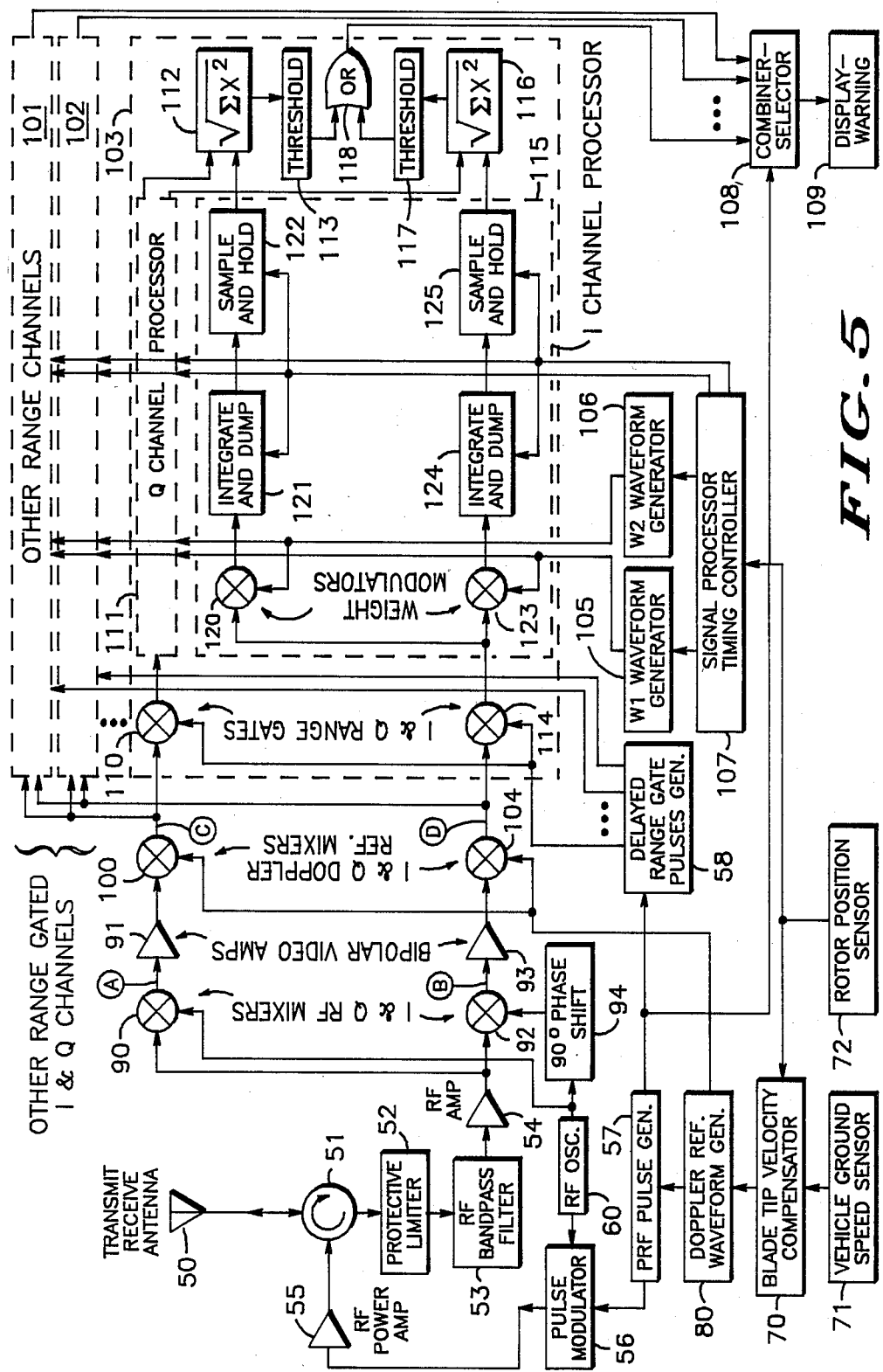
FIG. 5 is a block diagram of the radar illustrating a preferred embodiment of the signal processing that is part of my invention.
Figure 6A:
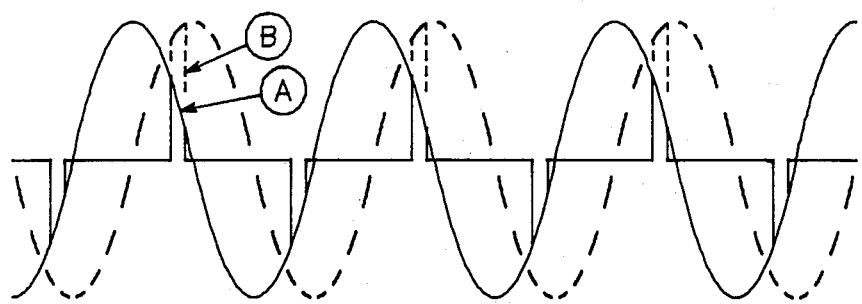
FIGS. 6 (A-D) shows waveforms at various points in the block diagram of FIG. 5 that would result from echoes from hypothetical point targets with optimum and non-optimum Doppler shift frequencies.
Figure 6B:
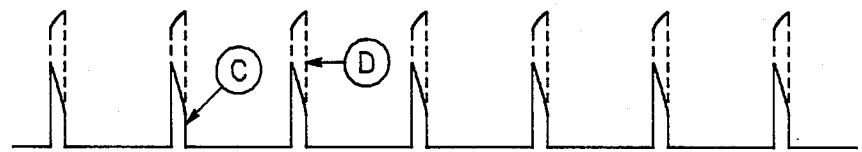
Figure 6C:
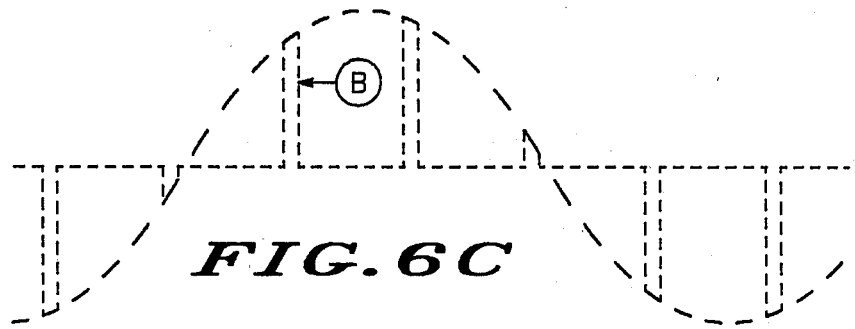
Figure 6D:
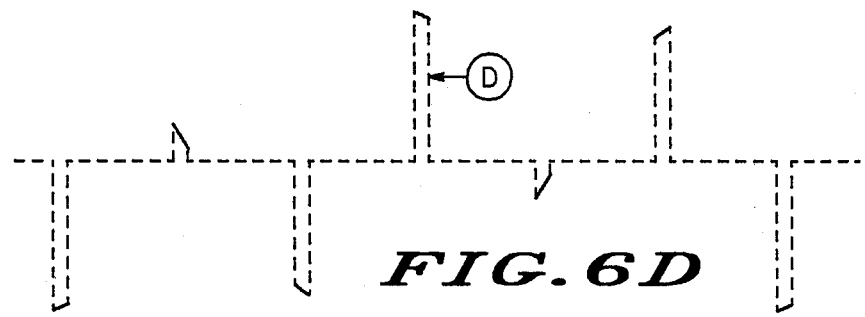

FIG. 5 is a block diagram that exemplifies a preferred embodiment of the subject invention. It must be understood that other embodiments are well known in the state of the art and could be applied without altering the unique aspects of my invention.

For clarity in correlating with the structure of the claims, elements 50 through 58 are typical elements of the pulsed radar that is a basic part of my invention, element 60 is an oscillator for generating a radio frequency reference waveform, elements 70 through 72 comprise a tangential velocity vector sensor, and element 80 functions as a generator for generating a Doppler reference waveform. Elements 90 through 94 comprise apparatus for combining the input signal with differentially phase-shifted versions of the RF reference waveform generated by element 60. Elements 100 through 108 comprise a range gated filter, while element 109 comprises an output device for indicating the detection of objects hazardous to helicopter navigation.

Commencing now with a detailed description of the operation of the system depicted in FIG. 5, CW rf reference oscillator 60 supplies an input to a pulse modulator 56. Pulse repetition frequency (prf) pulse generator 57 supplies another input to pulse modulator 56. The output of modulator 56 comprises a sequence of bursts of rf energy. These are applied to an rf power amplifier 55 whose output, in turn, is applied to a circulator 51. This passes the rf power pulses to antenna 50, from which they are radiated into space.

After each pulse radiated by antenna 50, echos are received from radar reflecting objects in the surrounding space. These echos have Doppler shifts related to the relative motion of antenna 50 and the reflecting object causing each echo. Circulator 51 conducts these received pulses, with minimal attenuation, to a protective limiter 52. This element is a common component is pulsed radar systems and protects receiver circuits have the high power pulses coming from circulator 51 because of antenna reflections or leakage in the circulator 51. The limiter has only a minimal effect on the received signals.

The output of limiter 52 is applied to an rf bandpass filter, 53, which suppresses interference by excluding rf energy at frequencies remote from those transmitted while transmitting the Doppler shifted pulse spectrum of the received signals. The output of bandpass filter 53 is applied to rf amplifier 54, which raises the levels of the received echos and background noise to a value where they may be processed by subsequent circuits without degrading the signal to noise ratio of the radar system.

Another element of the radar system is a delayed range gate pulse generator 58. This outputs one or more gate pulses delayed from the transmitted pulse time by intervals corresponding to particular ranges at which it is desired to detect hazardous objects.

As mentioned previously, the preceding components can be rearranged in various ways, or other components may be substituted therefor, without altering the spirit of my invention. For example, rf amplifier 54 could be replaced by a mixer and CW heterodyne oscillator followed by an intermediate frequency amplifier, as is common in radar system design.

RF reference generator 60 also supplies reference inputs into mixers 90 and 92. The reference input to 92 is applied through a 90 degree phase shifter, 94. The signal inputs of mixers 90 and 92 are both the output of rf amplifier, 54. The difference frequency outputs of mixers 90 and 92 are accepted and amplified by bipolar video amplifiers 91 and 93, respectively; other frequency components in the outputs of mixers 90 and 92, such as sum frequencies, rf, and reference leakage signals are excluded by low pass filtering in the video amplifiers 91 and 93. Since the duration of each transmitted pulse, taken above to be 50 nanoseconds for illustrative purposes, is very short compared to the duration of a cycle of the highest Doppler shift frequencies (for a typical rf wavelength of 0.032 meter, the highest Doppler frequency shift is 20,937.5 Hz and the duration of one cycle is 47,761 nanoseconds), the outputs of amplifiers 91 and 93 comprise a sequence of bipolar amplitude modulated video pulses whose peaks trace out the sinusoidal Doppler signals. In effect, the bipolar video pulse outputs of amplifiers 91 and 93 are 50 nanosecond wide samples of the Doppler waveforms.

The arrangement described produces simultaneous samples of two Doppler waveforms that are shifted in phase by 90 degrees. As is well understood in the radar system design art, this process permits subsequent signal processing to be carried out in such a way as to validate the assumptions of zero phase difference at $t=0$ between the Doppler reference sinewave and the actual Doppler waveform, which assumptions were made in establishing equations 11 and 18 above.

Equations 11 and 18 above include a first term that is the phase vs. time function of a sinusoidal Doppler reference waveform having a frequency equal to the Doppler frequency return from a fixed object at the instant the antenna velocity vector is pointing at it. This reference waveform is generated by a Doppler reference waveform generator, 80, which is, in turn, controlled by the output of a blade tip velocity compensator 70. Blade tip velocity compensator 70 combines the outputs of a vehicle ground speed sensor 71 and a rotor position sensor 72 in such a way as to assure that the Doppler reference waveform frequency corresponds closely to the frequency of the Doppler shift of the echo from any fixed object in the plane of the rotating antenna when the antenna's velocity vector is aligned directly toward the object. This requires the reference frequency to be controlled by inputs from the rotor shaft and from a ground velocity sensor, as discussed above. Should the helicopter be hovering, the frequency would be independent of rotor position, and dependent only on the rotor rotation rate.

PRF pulse generator 57 is also controlled by Doppler reference waveform generator 80, to assure that the prf is high enough to meet the Nyquist requirements for unaliased sampling of the highest expected Doppler shift. Also, undesirable beats between multiples of the Doppler reference frequency and the prf can be eliminated by making the prf an integer multiple of the Doppler reference waveform frequency. To meet the Nyquist criterion, the integer multiple must equal or exceed 2. As an example, a value of 2 is employed; then the Doppler reference waveform applied to the I and Q Doppler reference mixers can be conveniently obtained by a flip-flop frequency divider, which can be included in Doppler reference waveform generator 80.

The Doppler reference frequency required to compensate for the effects of helicopter ground velocity is, from Eqn. 6:

$$f_R = \frac{2}{\lambda_o} (V_H \sin(\xi - \Omega(t)) + V_T) \qquad \text{Equation (19)}$$

The number, $N_R$, of reference frequency cycles, $f_R$ occurring per revolution of the rotor is $$N_R = \int_t^{t+T_R} f_R(x)dx = \frac{2}{\lambda_o} V_T \cdot T_R \qquad \text{Equation (20)}$$

where $T_R$ is the rotor period, i.e., $$T_R = 2\pi b/V_T \qquad \text{Equation (21)}$$

$T_R = 0.169$ seconds, nominal, $$N_R = 4\pi b/\lambda_o \qquad \text{Equation (22)}$$

With the chosen values of b and $\lambda_o$, $$N_R = INT(3534.29) = 3534 \qquad \text{Equation (23)}$$

Note that $N_R$ is independent of the rate of rotation of the rotor. This means the second term in Eqn. 19 can be controlled by adjusting the average value of the reference frequency to obtain a fixed number of cycles per revolution of the rotor.

The fractional count discarded in Eqn. 23 can easily be reduced to zero by slight adjustments of the radar wavelength or the mounting position of the antenna on the rotor.

Figure 10B:
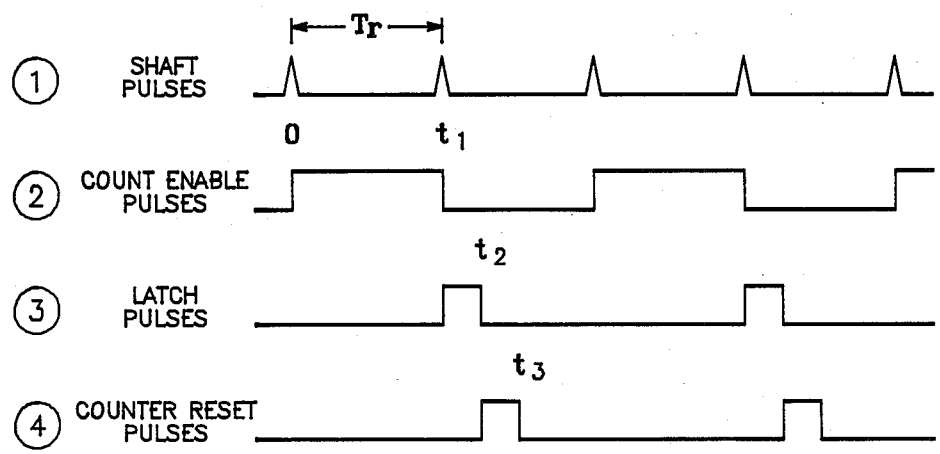
FIG. 10-A shows a functional block diagram of a subsystem to allow a Doppler reference signal's frequency to be maintained at an optimum value in spite of variations in rotor rotation rate and helicopter ground speed heading variations.

Based on Eqn. 23 FIG. 10-A shows a block diagram of a preferred embodiment of a subsystem combining the functions of blocks 72, 70, and 80 of FIG. 5 that will maintain the Doppler reference frequency at the optimal value given by Eqn. 19.

FIG. 10-B shows waveforms at four locations in the block diagram of FIG. 10-A.

The radar prf. is generated by a voltage controlled oscillator 220. It is connected to a servo control loop comprising a flip-flop 208; a digital counter 210; a digital subtractor 212; a digital latch 214; a digital-to-analog converter 216; a feed-back error amplifier 218, a summer 226, and an inverter 224.

A digital reference generator 222 supplies a fixed binary number to one of the inputs of digital subtractor 212. To avoid requiring digital-to-analog converter 216 to operate at an input near the all-zero's to all-one's transition, a fixed offset is added to $N_R$, nominally equal to one-half the range of D-A converter 216. For an 8-bit converter as shown in FIG. 10-A, this would be 128. Thus the number generated by digital reference generator 222 is 3543-128, or 3506. Generator 222 actually comprises a fixed set of parallel logic connections to one of the subtractor parallel input "ports" and represents the binary input corresponding to 3506.

One pulse for each revolution of the helicopter rotor shaft is generated by a pulse generator 232, and is applied to a flip-flop 206; these pulses are shown in line (1) of FIG. 10-B. The output of flip-flop 206 creates alternating count-enable periods and processing periods, each of duration $T_R$, as shown in line (2) of FIG. 10-B. During the processing intervals, a pulse generator 204, triggered by the falling edge of each count-enable pulse, generates a latch pulse that is applied to digital latch 214. The falling edge of the latch pulse triggers another pulse generator, 202, whose output is applied to the reset terminal of counter 210. The latch pulses are shown in line (3), and the reset pulses are shown in line (4) of FIG. 10-B.

During the count-enable period, counter 210 counts the Doppler reference signal cycles, which are one half of the radar pulse count, as controlled by flip-flop 208. Digital subtractor 212 continually computes the difference between the counter's output and the output of the digital reference generator. At the end of the count enable period, the low 8 bits of the subtractor output are latched and held by latch 214, and applied to digital-to-analog converter 216.

If the Doppler reference signal count equals the value specified by Eqn. 23 the subtractor output will be 128, and the output of the 8 bit digital-to-analog converter will be at the middle of its range. This input to the servo amplifier is counterbalanced by a negative offset bias applied to a terminal 219, that is coupled to the input of feed-back error amplifier 218. A null condition will exist and voltage controlled oscillator 220 will remain at the required frequency.

In a manner well understood by those skilled in the art, deviations of the Doppler reference frequency from the optimum value will be corrected by the action of the above described servo loop, which includes stabilizing filter components, 217. The circuit shown should maintain the Doppler reference frequency within ±1 Hz of its optimum value, which is well within the requirements.

The term $(2 V_H/\lambda_o \sin (\xi - \Omega(t))$ is implemented by summing appropriately scaled voltages together with the output of error amplifier 218, and applying the sum to the frequency control voltage input of voltage controlled oscillator 220. From analytic geometry, $$V_H \sin (\xi - \Omega) = V_H \sin \xi \cos \Omega - V_H \cos \xi \sin \Omega \qquad \text{Equation (24)}$$

$V_H \cos \xi$ and $V_H \sin \xi$ are merely the X and Y components of the vector helicopter velocity relative to its own axes. These quantities are commonly available from typical ground velocity sensors. Likewise, $\sin \Omega$ and $\cos \Omega$ can be readily obtained from an electromechanical sin-cos generator 236 coupled to the helicopter's rotor shaft. The negative sign of the second term on the right side of Eqn. 24 can be conveniently obtained by summing it into the input of inverter 224, which is required in any case to cancel the inversion produced by summer 226 to assure servo loop stability. The various coupling and feed-back resistors can be set to produce the required scaling factors.

The output of Doppler reference waveform generator 80 (FIG. 5) is applied as a reference signal input to I and Q Doppler mixers 100 and 104. With this assumed reference input, the I and Q Doppler reference mixers become essentially reversing switches that change state from inverting to non-inverting and vice-versa at the time of each transmitter pulse. For times close to zero the wire echo pulse trains emitted by Doppler reference mixers 100 and 104 will be constant in amplitude, as shown in FIG. 6-A and FIG. 6-B, in which circled numerals refer to similarly denoted points in FIG. 5 where the waveforms can be observed. Their relative amplitude ratio will be the tangent of the phase angle that was assumed to be zero in equations 11 and 18. When the round-trip delay time at t=0 happens to be such that one of the pulse train's amplitudes is close to zero, the amplitude of the other will be close to maximum. As is well understood in Doppler radar design, the sum of the squares of the two pulse train amplitudes will be independent of the phase angle at t=0 and the same as if the phase angle had the assumed value of 0, thus the signals can be further processed for obstacle detection as if the assumption were true.

At times remote from t=0, when the wire echo Doppler frequency is lower than the reference frequency, or for the return from a clutter element whose Doppler shift is also lower than the reference Doppler frequency, the pulse train input to the I Doppler reference mixer 104 is as shown in FIG. 6-C. The resultant output pulses periodically reverse in polarity, as shown in FIG. 6-D.

It is easy to see that integrating the waveform of FIG 6-B, corresponding to the wire echo, will give a relatively large result, whil integrating a pulse sequence like that represented by FIG. 6-D, for a typical clutter element echo, will give a relatively small response, thus tending to selectively discriminate a wire echo from clutter echos. However, it remains to be shown that, when the reponses from a large number of clutter elements are combined, the processor of FIG. 5 can nevertheless provide the required discrimination.

In the case where more than one radar reflector is present, an in particular, for ground clutter echos, the outputs of mixers 100 and 104 during the intervals after each transmitted pulse will comprise a time sequence of possibly overlapping echo pulses. The delay of any single echo pulse from the transmitted pulse will be a function of reflector range, as is well understood. To assist in rejecting clutter returns, this time sequence can be gated on for a time equal to the transmitted radar pulse duration after a delay corresponding to the desired range for detection. Such range gating is common in radar systems. This is accomplished by applying the outputs of delayed range gate pulse generator 58 to a number of pairs of gating devices, such as 110 and 114, one pair in each of a number of range channels 101, 102, 103, etc. Range channel 103 is selected for further discussions; the other range channels perform similarly, but their range gate pulses are delayed by different amounts.

Range gates can be implemented in a number of ways. In FIG. 5 they are functionally represented as mixers, 110 and 114. As is well understood, mixers can function as range gates if the range gate pulse input is normally at zero and is pulsed during the desired gate time to a non-zero value.

With this implementation of the range gates, the output is a sequence of pulses at the radar prf. Such a waveform has a low duty cycle. An alternate implementation could include a "sample and hold" feature, which would make the range gate output remain at the level of the preceding pulse during the interval between pulses.

Regardless of whether the output of the range gate is a train of pulses or a sampled and held version of the input, the following analysis applies to the waveforms corresponding to spectral components (of the range gate output) below ½ the radar prf. Except for a constant factor, these waveforms correspond to the envelope of the range gate output pulses.

It should be noted that the range gate output pulses are bipolar, i.e., can be of either plus or minus polarity compared to the interpulse interval level, which is assumed to be at zero volts.

The envelopes of the bipolar pulses emitted from range gate or mixer 110 can be derived by assuming a CW radar tansmitter and summing the CW Doppler returns from only those clutter elements scattered throughout the entire clutter patch 18 of FIG. 1. To allow for the fact that the clutter patch moves as the rotor turns, as shown in FIG. 4, the patch can be expanded accordingly in its angular extent and in its range dimension, and then assumed to be fixed in location. The patch's elements are likewise taken as fixed.

The average power scattered by each clutter element is:

$$P_{CE} = P_i \sigma_o \Delta A \qquad \text{Equation (25)}$$

where
$p_i$ is the incident power density
$\sigma_o$ is the radar cross section per unit area corresponding to the terrain type,
and $\Delta A$ is the area of the clutter element.
From FIG. 4, $$\Delta A = \left( \frac{C_T}{2\cos\gamma} + V_T \Delta t_1 \right) R_o \cos\gamma \Delta \Psi \qquad \text{Equation (26)}$$

The incident power density is given by:

$$P_i = \frac{P_T}{4\pi R_o^2} \cdot G(\theta(t) - \psi, \gamma) \qquad \text{Equation (27)}$$

where $P_t$ is the transmitted pulse power, $G(\theta(t)-\Psi, \gamma)$ is the antenna pattern factor, and $\theta(t)-\Psi$ and $\gamma$ are, respectively, the horizontal and vertical components of the angle between the antenna beam and the line of sight to the clutter element, which is located at the angle $\Psi$ from the projection of the antenna beam onto the ground when t and $\theta(t)$ both equal 0.

The received signal power available from the radar antenna is:

$$P_{RCE} = \frac{P_E}{4\pi R_o^2} \cdot \frac{\lambda_o^2}{4\pi} \cdot G(\theta(t) - \psi, \gamma) \qquad \text{(Equation 28)}$$

where $P_E/4\pi R_o^2$ is the power density at the radar antenna due to the power scattered by the clutter element, $\lambda_o^2/4\pi$ is the effective receiving area of an isotropic antenna, and $G(\theta(t)-\Psi, \gamma)$ is the antenna pattern factor.

Although the range of the fixed clutter element is $R_o$ only at t=0, the preceding equation assumes that the variation of range with time is negligible in its effects on signal amplitude.

Combining equations 26, 27, and 28 and using the square root to derive the root-mean-square (rms) value of a normalized (i.e., referred to the antenna and assuming a normalizing circuit impedance of 1 ohm) clutter element signal voltage, $$v_{ce} = K_c \cdot G(\theta(t) - \Psi, \gamma) \text{volts, r.m.s.} \qquad \text{Equation (29)}$$

where $K_c =$

-continued $$\left( \frac{\rho_T \sigma_o \left( \frac{C_T}{2} + V_T \Delta t_r \cos\gamma \right) \lambda_0^2 \Delta \Psi}{4\pi R_0^2} \right)^{\frac{1}{2}} \text{volts, r.m.s.}$$

The radar power scattered by the wire is:

$$P_w = P_i \sigma_w \qquad \text{Equation (30)}$$

where $\sigma_w$ is the radar cross section of the wire.

The radar cross section of the wire can be derived as follows: The radar cross section of a cylinder of length L and radius a, at normal incidence is:

$$\sigma = 2\pi L^2 a/\lambda_o \qquad \text{Equation (31)}$$

(*Reference Data for Radio Engineers*, I T & T Corp., 4th Edition, page 804.)

This formula assumes the incident wavefronts are planar. In the case where the range to the radar is such that the wavefronts are spherical, as discussed above, only that portion of the wire corresponding to less than 1/16th wavelength deviation of the spherical wavefront from a plane contributes to the reflected signal. (Round trip difference of ⅛th of a wavelength). Thus:

$$\sqrt{R_0^2 + (L_{eff}/2)^2} - R_0 = \lambda_0/16 \qquad \text{Equation (32)}$$

Approximately, when $L_{eff} << R_o$, $$(L_{eff})^2 = \lambda_o R_o/2$$

thus:

$$\sigma_w = \pi a R_o \qquad \text{Equation (33)}$$

The wire is assumed to be at the same elevation as the radar antenna. Thus the angle $\gamma$ becomes 0. Also, as shown above, the reflection point on the wire corresponds to $\Psi = 0$. Thus the rms value of the normalized wire signal voltage is:

$$v_w = K_W \cdot G(\theta(t), 0) \qquad \text{Equation (34)}$$

Where: $K_w = \left( \frac{\pi a \lambda_0^2 P_r}{(4\pi R_0)^3} \right)^{\frac{1}{2}}$ volts, r.m.s.

for
a = 0.00127 m (about #10 gauge),
$P_t$ = 1 watt,
$\lambda_o$ = 0.032 m,
$R_o$ = 70 m,
$K_w$ = 0.0775 microvolts rms at the peak of the antenna beam
$G(\theta(t),o)$ = 59.5
$v_w$ = max, peak = 6.52 microvolts.

Continuing with the derivation of the envelope of the bipolar pulses that are emitted by range gates 110 and 114 and that represent clutter returns, this envelope is a function of time during the integration interval from $-\Delta_I/2$ to $+\Delta_I/2$ and is obtained by summing the contributions of all the clutter elements in the zone from $\Psi = \Psi_{LL}$ to $\Psi_{UL}$, where $\Psi_{LL}$ and $\Psi_{UL}$ are chosen using FIG. 3 to include the angular region swept over by the clutter patch 18 during the integration perod. The contribution of the "ith" clutter element at $\Psi_i$ is given by:

$$v_{cei} = \sqrt{2} \; v_{ce}(\Psi_i, t) \cos(\Phi_{EC}(\Psi_i, t)) \qquad \text{Equation (35)}$$

Thus $$v_e(t) = \sqrt{2} \sum_{\Psi = \Psi_{LL}}^{\Psi = \Psi_{UL}} v_{ce}(\Psi_i, t) \cos(\Phi_{EC}(\Psi_i, t)) \qquad \text{Equation (36)}$$

The complexity of the relation between $\Phi_{EC}$ and time, t, makes further analysis impractical. Instead, a Monte Carlo approach was taken to estimate performance. In this approach, the region from $\Psi_{LL}$ to $\Psi_{UL}$ was arbitrarily divided into 31 elements. Rather than assign the same value of $\sigma_o$ to every element, as implied above, a unique random value $\sigma_{oi}$'s was assigned to each element, such that the $\sigma_{oi}$'s corresponded to an average $\sigma_o$ appropriate to the terrain, as discussed below. The Rayleigh distribution is appropriate since each clutter element contains a large number of scatterers having slightly different doppler shifts.

The rms $\sigma_o$ was selected as $-15$ dB. The basis for this selection is as follows: $\sigma_o$ is a function of frequency, polarization, type of terrain, and grazing angle, here equal to $\gamma$. At 70 meters slant range and 10 meters relative height, $\gamma$ becomes 8.21 degrees. The frequency has been selected for demonstration purposes as 9375 mHz, commonly referred to as "x-band". The polarization, to emphasize suspended wire echos, is horizontal. To assure a conservative estimate of performance, an upper limit value of $\sigma_o$ is appropriate, so a terrain type corresponding to a forested area was used. For those conditions, a review of Sholnik (*Radar Handbook*, Skolnik, McGraw-Hill, Chapter 25, especially FIGS. 22 and 26.) suggested the value selected $-15$ dB. Because of the random selection for the $\pi_{oi}$ of the ith clutter element, some $\sigma_{oi}$'s will exceed the rms value; a rough estimate of the maximum $\sigma_{oi}$ would be about $-9$ dB.

The antenna pattern factor, $G(\theta_H, \theta_V)$, where $\theta_H$ and $\theta_V$ represent the off-beam angles in the horizontal and vertical planes, was selected for performance evaluation purposes as:

$$G(\theta_{HS} \theta_V) = \frac{\sin\left( \frac{\pi a'}{\lambda_0} \sin\theta_V \right)}{\left( \frac{\pi a'}{\lambda_0} \sin\theta_V \right)} \cdot \frac{\sin\left( \frac{\pi b'}{\lambda_0} \sin\theta_H \cos\theta_V \right)}{\frac{\pi b'}{\lambda_0} \sin\theta_H \cos\theta_V} \qquad \text{Equation (37)}$$

This is derived from a formula for a uniformly illuminated rectangular aperture given in Skolnik, supra, page 9–8. b' and a' are the aperture dimensions and where derived from the earlier choice of ½ power 2-way beam widths of 30 degrees and 20 degrees in the horizontal and vertical directions, respectively.

In Equation 37, $\theta_V$ is the same as the angle $\gamma$; $\theta_H$ equals $(\theta(t) - \Psi)$.

In selecting the limits of $\Psi$ over which to sum the clutter elements' contributions, the location of the first nulls in the horizontal pattern, at $$\psi_{null} = \frac{\pi b'}{2_0} \sin\theta_{Hnull} \cos\theta_V = \pm \pi \qquad \text{Equation (38)}$$

were used.

$$\theta_H \text{null} = \pm \arc \sin (\lambda_o/(b' \cos \theta_V)) \qquad \text{Equation (39)}$$

With $\theta_V(\gamma) = 8.12$ degrees and with b' corresponding to a 30 degrees overall horizontal beamwidth, $$\theta_H \text{null} = \pm 36.1 \text{ degrees.} \qquad \text{Equation (40)}$$

To these limits were added $\pm(\Delta t \pm /z)(V_t/b)$, the beam rotation during the integration period. For an integration period of 7.4 milliseconds, the rotation amounts to 7.9 degrees. Thus $\Psi_{LL}$, $\Psi_{UL} = \pm 44$ degrees, and the angular extent of each clutter element equals 2.84 degrees.

Based on the preceding developments, FIG. 7-A shows typical envelopes of the bipolar pulses emitted by the I and Q channel range gates, 110 and 114, corresponding to $V_C$ of equation 36, over the integration interval. Of course, another randomly selected set of clutter element Doppler generator amplitudes would result in different envelope waveforms. In the Monte Carlo analysis, 15 such pairs of waveforms were generated to provide a data base for statistical analysis of system performance.

FIG. 7-B shows the I and Q channel pulse envelope waveforms resulting from the wire echos; these waveforms are proportional to cos $\Phi_{EC}$ and sin $\Phi_{EC}$, respectively, $\Phi_{EC}$ being defined by equation 18 above.

FIG. 7-B assumes that the midpoint of the integration period coincides with the time when the antenna beam is perpendicular to the wire. As mentioned above, with two parallel overlapping integrators, the worst case offset from this optimum timing is $\Delta_I/4$; FIG. 7-C shows the waveforms for this case and they are further discussed below.

The above described range gated pulses from gates 110 and 114 are applied respectively to Q and I channel processors, 111 and 115. The operation of one of these, I channel processor 115, will be described in detail. The other operates identically.

Range-gated bipolar pulses from range gate 114 are applied in parallel to a pair of weight modulators 120 and 123. As shown in FIG. 7-B, the envelope of the I channel pulses resulting from the echos from a wire in the plane of rotation of the helicopter rotor remains at a fairly constant single-polarity value over the integration interval $\Delta_I$, while as FIG. 7-A shows, the envelopes of the pulses from a clutter element fluctuates in a bipolar fashion with alternating positive and negative epochs. Noting the ordinate scale differences between FIGS. 7-A and 7-B, it is apparent that the wire signal level is considerably weaker than the clutter waveform. As implied earlier, integration must be used to attenuate the clutter waveforms sufficiently to keep them below a threshold level that the wire signals can exceed. In principle, random peaks of the clutter waveform will occasionally exceed any pre-established threshold, producing what is known in the current state of the art as a "false alarm". For operational suitability, the threshold must be set so that the average rate of such false alarms is low enough to be tolerable. The design of the processor must be such as to enhance the wire signal over the clutter to meet this goal.

Accordingly, an appropriate signal processing approach is to integrate the outputs of the range gates over an integration interval, sample and hold the integator output at the end of the interval, and then reset the integrator output to zero to start the next integration period.

For optimum system performance, the antenna beamwidth should be centered on the normal to the wire at the midpoint of the integration period. However, the wire will not usually be properly located for this optimum operation. To allow for the typical relative misalignment of the echo signal envelope as controlled by the antenna beam pattern and the start and stop of the integration interval, the system could include two (or more) overlapping integrators as shown in FIG. 5. The integration periods of the integrate and dump devices, 121 and 124, are staggered so that the beginning of device 121's integration period is midway through that of device 124.

With this arrangement, the worst case interval between mid-integration and antenna beam—wire perpendicularity is $\Delta_I/4$. FIG. 7-C shows the waveforms of the I and Q channel wire signals for this case. In both cases, the reference frequency phase, corresponding to equation 10, was taken as zero at t=0, the mid-integration time. This causes a relatively constant phase angle to be added to $\Phi_{EC}$, explaining why the curves of FIG. 7-C are not merely time shifted versions of the curves of FIG. 7-B. After the final combination of the I and Q channel outputs, as described below, the effects of this constant phase angle vanish.

As is well known in the state of the art, the rejection by an integrate and dump filter to out-of-band sinewaves can be improved by first multiplying the input signals by a weighting function that attenuates the input signals near the beginning and end of the integration period. Applying the weighting function will slightly broaden the main lobe, but will greatly attenuate the out-lying response lobes.

A typical and well known weighting function is the Hamming weighting function, respresented by:

$$W(t) = 0, \text{ for } t < -\Delta t_2/2 \qquad \text{Equation (41)}$$
$$= 0.08 + 0.92 \cos^2(\pi t/\Delta t_2)$$
$$\text{for } -\Delta t_2/2 \leq t \leq \Delta t_1/2$$
$$= 0, \text{ for } \Delta t_1/2 < t$$

This function has a maximum value of 1.0 at t=0, and falls smoothly to 0.08 at t= $\pm \Delta_I/2$, the beginning and end of the integration interval. This function increases the $-3$ dB bandwidth by a factor of 1.47, but suppresses all sidelobes of the frequency response by over 40 dB. The weighting function waveforms are generated by W1 waveform generator 105 and W2 waveform generator 106. The timing of the generated waveforms is controlled by signal processor timing controller 107 which is, in turn, controlled by signals obtained from rotor position sensor 72. The optimum integration time corresponds to the time for the rotor blade to rotate through a certain angle; accordingly the integration intervals may need to be adjusted in consonance with the rotor rotational rate.

In Q channel processor 111, overlapping integrate and hold actions are proceeding in synchronism with the intervals in I channel processor 115. The corresponding outputs in each processor are combined in root-sum-of-squares processors 112 and 116. These are also well known in the state of the art and can be implemented in a variety of ways.

Figure 9:
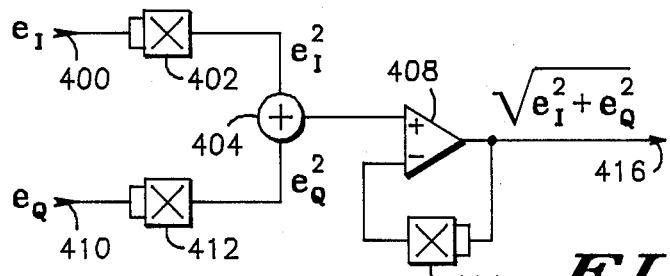
FIG. 9 shows a functional block diagram of a typical circuit to generate the square root of the sum of the squares of two input signals.

FIG. 9 shows a functional block diagram of one approach to either processor 112 or 116. Analog multipliers 402 and 412 form squares of the I and Q signals applied to terminals 400 and 410. The squares are summed by an analog summer 404. The square root is generated by using a multiplier 414 as a squarer in the feedback return of an operational amplifier, 408.

With a slight degradation in system performance, simpler schemes based on rectification of each input and selection of the larger rectified signal by a network including a pair of diodes can be used. Taking the two inputs to be proportional to the sine and cosine of a phase difference, $\Delta\Phi$, the first approach provides an output that is independent of $\Delta\Phi$, while the second has an output that fluctuates without tolerable limits over the range of $\Delta\Phi$ from 0 to $2\pi$. Subsequent detection thresholds can be raised slightly to accommodate this variation, and the small degradation in the false alarm rate that results may be tolerable.

In the performance evaluation below, the more precise analog root-sum-square technique is assumed.

The outputs of root-sum-of-squares devices 112 and 116 are applied, respectively, to threshold devices 113 and 117. These each accept an analog input and provide a logic input that changes state from false to true according to whether the input is below or above an adjustable threshold value. The logic outputs of 113 and 117 are logically OR'd or OR device 118. The result is a warning output logic state if either of the overlapping integrate and dump processors detects a hazard at the range defined by the given range gate delay.

Performance Evaluation

In analyzing system performance, each processing block will be assumed to have a gain of unity, so signal voltages will be presented in terms of their equivalent antenna terminal voltages. Moreover, watts will be converted to volts 2 assuming an impedance of 1 ohm.

Figure 8:
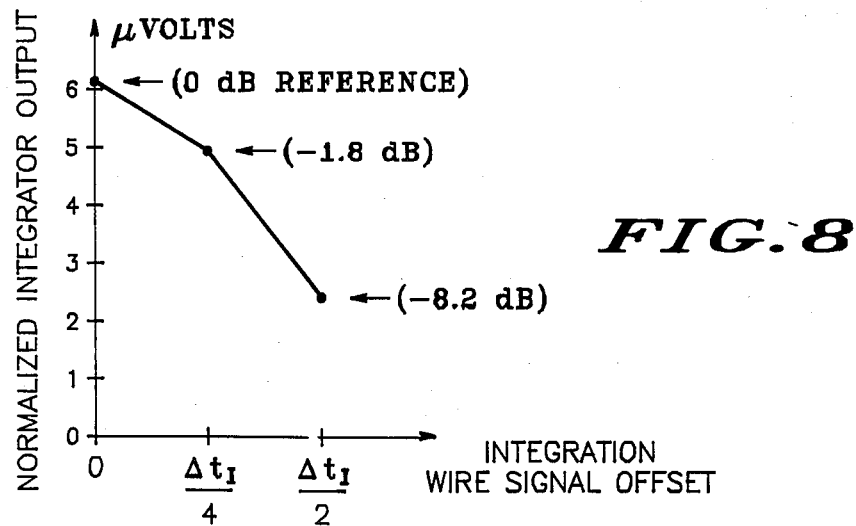
FIG. 8 shows the processor output signals for reflections from wires located so that the instant of their maximum Doppler shift is displaced from the center of the signal processor integration period by zero, $\frac{1}{4}$th the integration period, and $\frac{1}{2}$ the integration period.

FIG. 8 shows the output of the root sum square combiner for one range channel as a function of the time offset of the midpoint of the integration period from the instant of antenna beam—wire perpendicularity. These results were obtained by computer simulation of the modulation by the weighting function and subsequent integration over the period $-\Delta_I/2$ to $\Delta_I/2$ of the I and Q waveforms of FIGS. 7-B and 7-C, plus similar waveforms for an offset of $\Delta_I/2$. To normalize the integrator outputs, they were divided by the integrator output resulting from 1 volt d-c being applied, which is actually the integral of the Hamming weighting function, equal to 0.54 $\Delta_I$. Finally, the computer program calculated the square root of the sum of the I and Q channel integrator outputs, at the end of the integration period.

If only a single integration channel were used, the worst case offset would be $\Delta_I/2$. This would correspond to the instant of antenna beam/wire perpendicularity occurring at the end of one integration period and at the beginning of the following period. FIG. 8 shows that an 8.20 dB loss would have to be included in the performance evaluation to account for this worst case offset.

With two overlapping integrator channels, the worst case offset becomes $\Delta_I/4$ and the loss is only 1.86 dB. Thus, for performance evaluation, the wire signal at the input of the threshold device is taken as 4.9 microvolts.

To obtain the clutter output at the same point, as mentioned above, a statistical approach must be used to evaluate the computer simulation results. Fifteen cases were computed, each with a unique set of 31 clutter element equivalent point scatterers. For these 15 trials, the average normalized integrator output for the clutter, $V_{OC}$, was 1.06 microvolts, while the mean squared output, $V_{OC}^2$, was 1.535 (microvolts)$^2$.

Because of the narrow bandwidth of the integrators and the I/Q process, $V_{OC}$ corresponds to the envelope of narrow band noise, for which $$(\overline{V_{OC}^2})^{\frac{1}{2}}/\overline{V_{OC}} = 2/\sqrt{\pi} = 1.128 \qquad \text{Equation (42)}$$

The simulation results give a value for this ratio of 1.169, a deviation from the theoretical value that is consistent with sampling statistics. The power, given in microvolts$^2$ (assuming a 1 ohm normalizing impedance), of the equivalent narrow band clutter noise, $P_C$, ahead of the r-f mixers, 90 and 92, is $\frac{1}{2}$ the mean squared value of its envelope. Thus:

$$P_C = 0.5\overline{V_{OC}^2} = 0.768(\mu\text{Volts})^2 \qquad \text{Equation (43)}$$

This is a larger result than that derived from the sample average, $\overline{V_{OC}}$, and is used to assure a conservative evaluation.

Another source of interference noise at the output of the sum of squares combiner is the inherent "front-end" thermal system noise. For this application, a noise figure of 15 dB is assumed. Considerably better can be attained, but, as shown below, the improvement is not required.

The noise power spectral density is then given by:

$$W = KTFn \qquad \text{Equation (44)}$$

when:
K = Boltzmann's constant
T = Absolute temp., degrees Kelvin
KT = $4 \times 10^{-21}$
Fn = $10^{1.5}$ = 31.6
thus:

$$w = 1.265 \times 10^{-19} \text{ watts/H}_z, \text{ or volts}^2/\text{H}_z$$

The system bandwidth limiting filter is the I and Q channel integrator. Without the Hamming weighting, its two-sided noise bandwidth would be $1/(\Delta_I)$. However, the modulation applied by the weight multipliers causes the noise bandwidth to increase by a factor of 1.36. (Skolnik, page 20-30, Table 9).

The Doppler reference mixers, 100 and 104, plus the I and Q channel integrators are equivalent to a narrow bandpass filter centered on the Doppler reference frequency and having a noise bandwidth of $1.36/(\Delta_I)$. Including the noise in the negative Doppler frequency region contributes another factor of 2. Thus the equivalent r-f noise bandwidth ahead of I and Q r-f mixers 90 and 92 is given by:

$$B_n = 2(1.36/\Delta t_1) = 367.6 \text{ Hz} \qquad \text{Equation (45)}$$

Accordingly, the mean squared voltage corresponding to the equivalent front end noise power, normalized for 1 ohm impedance, becomes:

$$\overline{V_n^2} = B_n W = 4.65 \times 10^{-17} \text{ volts}^2 \qquad \text{Equation (46)}$$

The output, after squaring, summing, and taking the square root, is equivalent to the time-varying envelope of a narrow band noise signal whose mean squared voltage is $4.65 \times 10^{-17}$ volts$^2$. The envelope, $V_{ON}$, has a mean value given by:

$$\overline{V_{ON}} = (\pi \cdot \overline{V_n^2}/2)^{\frac{1}{2}} = 0.00855 \ \mu\text{Volts} \quad \text{Equation (47)}$$

Comparing this with the conservative estimate for the average clutter output, which can be obtained by combining equations 42 and 43 and the observed value of $V_{OC}^2$, i.e., $V_{OC} = 1.10$ microvolts, it is evident that the assumed 1 watt transmitter is more than adequate to obtain clutter and wire echos greatly in excess of the front end noise, which will accordingly be ignored in the following performance evaluation.

Threshold devices 113 and 117 of FIG. 5 apply a threshold voltage to discriminate against the clutter outputs. Only an input larger than the threshold voltage, $V_{TH}$ causes a logic "TRUE" output of the threshold device. The threshold level must be set sufficiently higher than the mean clutter level to prevent "false alarms" from being generated too frequently by random peaks of the integrator clutter output signal.

The radar antenna beam sweeps over the wire 5.9 times per second. On this basis, a false alarm as often as once every 20 seconds would not appear to place an excessive burden on the helicopter pilot, since a typical random false alarm would very likely be cancelled at the next antenna sweep, only 1/6th of a second later.

The threshold voltage must also be sufficiently lower than the worst case (worst case offset) wire signal level that an adverse summation of wire and clutter signals does not too frequently fail to cross the threshold.

With a rotor rotation rate of 5.9 revolutions per second and a typical forward vehicle velocity of 10 miles per hour (or 4.5 meters per second), and a range pulse width of 7.5 meters, a positive (99%) detection ought not to require more than 1.7 seconds, the time that the apparent reflection point on the wire remains within the range pulse limits. In that interval, the antenna beam points at the wire 9.9 times. Thus the probability of detection for any one passage of the antenna beam past the perpendicular to the wire should be greater than $(0.99)^{9.99}$ or 90.4%. However, for the worst case offset, two equal integrator wire signal outputs are obtained, with independent noise, thus the detection probability required for a single integrator output is $(0.905)^2$, or 0.82. (Rice, S. O. Mathematical Analysis of Random Noise, BSTJ Vol.s 23, 24, page 109, FIG. 7.) shows that, for a ratio of peak signal to rms narrow band clutter noise of:

$$V_{OW}/(P_C)^{\frac{1}{2}} = 5.59 \quad \text{Equation (48)}$$

in order to attain 80% probability of detection, $$V_{TH} \leq V_{OW} - 1.2 P_C^{\frac{1}{2}} \quad \text{Equation (49)}$$

Thus, $V_{TH}$ should be less than or equal to 3.849 microvolts.

If a random sample of the envelope of the clutter voltage (in the absence of a wire signal) were to cross the above derived threshold, the ratio of its amplitude to the clutter noise rms voltage, $(P_C)^{\frac{1}{2}}$, would be:

$$Y = 3.849/(0.7675)^{\frac{1}{2}} = 4.393 \quad \text{Equation (50)}$$

The probability of this occuring for the envelope of noise is:

$$P_{fa} = e^{-y^2/2} = 6.44 \times 10^{-5} \quad \text{Equation (51)}$$

which is obtained by integrating the Rayleigh distribution function that applies to the envelope of a narrow band noise signal. With two overlapping integrators, each producing a sample of the envelope every 7.4 milliseconds, the false alarm time is $$T_{fa} = 0.0074/(2 P_{fa}) = 57.4 \text{ seconds} \quad \text{Equation (52)}$$

This exceeds the operational requirement estimated above of 20 seconds average between false alarms.

In conclusion, the described system can satisfactorily warn a helicopter pilot of obstructions in his horizontal flight path, even in the presence of severe terrain radar echos.

Alternate Helicopter Ground Velocity Compensation

Should helicopter heading data not be available, but only the magnitude of the ground velocity vector, i.e., the ground speed, a limited form of compensation is feasible. For this case, the compensation will be fully effective only for detecting wires towards which the helicopter is moving on a course perpendicular to the wire. The speed compensation will degrade the ability to detect wires whose apparent reflection points are not dead ahead.

The Doppler reference frequency given above in Eqn. 6 becomes:

$$W_R = \frac{4\pi}{\lambda_0} (V_H + V_T) \quad \text{Equation (53)}$$

because $\beta$ is now assumed to equal $\xi$ and furthermore, the reference frequency is determined when $\theta(t) = 0$, at $t = t_0$. Similarly, the number of Doppler reference cycles in $T_R$, the period of revolution of the helicopter rotor becomes:

$$N_R = \frac{2}{\lambda_0} (T_R \cdot V_H + 2\pi b) \quad \text{Equation (54)}$$

Figure 11:
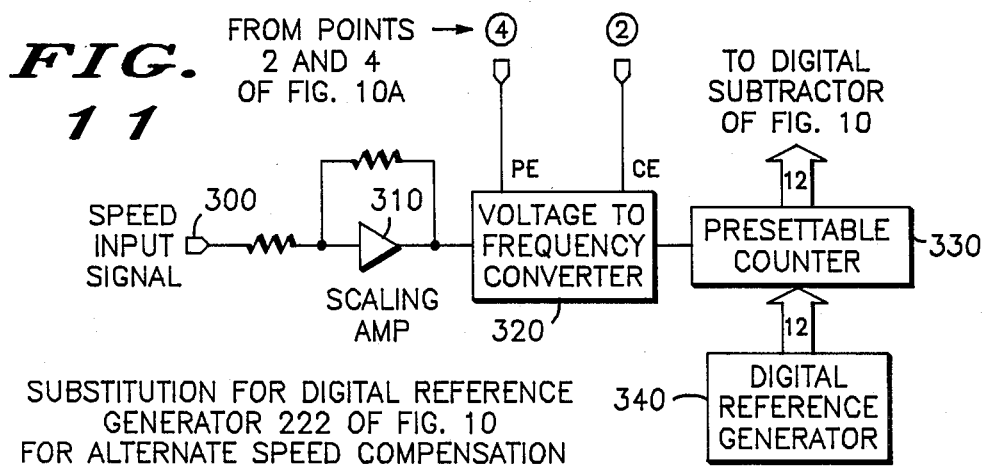
FIG. 11 shows a modification to the block diagram of FIG. 10-A for implementing an alternate form of helicopter ground speed compensation when heading information is lacking.

The first term no longer can be implemented by a signal added to the output of error amplifier 218 of FIG. 10A. Instead, the implementation must provide that the Doppler frequency count per revolution of the rotor shaft be modified by a number proportional to the product $T_R \cdot V_H$. FIG. 11 shows a replacement for the digital reference generator 222 of FIG. 10A to be used for this case. In addition, the output of the error amplifier, 218, is now connected directly to the input of voltage controlled oscillator 220. Elements 224, 226, 228, 230, and 236 are no longer needed.

In FIG. 11, a d-c voltage proportional to helicopter ground speed is assumed to be available, and it is applied to an input terminal, 300. A scaling amplifier 310 adjusts the level of this signal and pplies it to the control voltage input terminal of a voltage to frequency converter, 320. The output of converter 320 is a train of pulses at a frequency such that the number occuring during one revolution of the rotor shaft corresponds to the first term in Equation 54. At a speed of 10 miles per hour, this frequency is about 47 Hz. Since available voltage to frequency converters can operate down to about 1 Hz, this arrangement should be satisfactory for hovering.

The pulse train generated by voltage to frequency converter 320 is applied to the count input of a presettable counter, 330. A digital reference generator, 340, similar to device 222 of FIG. 10A, supplies the preset input to the presettable counter. The same count enable signal as developed in FIG. 10A at circuit point ② therein is applied to the count enable input of presettable counter 330. Likewise, the reset pulse developed at circuit point ④ of FIG. 10A is applied as a pre-set enable signal to presettable counter 330. The 12 bit parallel output of presettable counter 330 is applied to the digital subtractor, 212, of FIG. 10A in place of the output of digital reference generator 222.

With this arrangement, at the end of the count period, the digital subtractor's output that is sampled and held by latch 214 of FIG. 10 will again be an offset error signal suitable for controlling the voltage controlled oscillator 220 in a servo loop to maintain the Doppler reference frequency at the required value.

While I have described and analyzed above specific embodiments, further modifications and improvements will occur to those skilled in the art. It must be understood that my invention is not limited to the particular form shown and I intend in the appended claims to cover all modifications that do not depart from the spirit and scope of my invention.

I claim:

1. An obstacle detector for helicopters and the like having rotary blades, said detector comprising a pulsed Doppler radar including a processor for received radar signals having a plurality of range channels, each range channel including an in-phase and a quadrature channel and each in-phase and quadrature channel including overlapping integrators connected to integrate signals processed by said range channels and staggered so that integration periods overlap, and said radar further having a directional transmitting and receiving antenna mounted adjacent the outermost tip of one of said rotary blades so that the sensitive direction of said antenna is positioned generally parallel to the direction of movement of the outermost tip.

2. An obstacle detector as claimed in claim 1 wherein the processor further includes blade tip velocity compensating means for generating timing signals to operate the plurality of range channels.

3. An obstacle detector as claimed in claim 2 wherein the blade tip velocity compensating means includes a vehicle ground speed sensor and a rotor position sensor.

4. In a pulse Doppler radar including an antenna that is rotated about an axis remote from said antenna's center of radiation, said rotation establishing a rotating tangential velocity vector aligned substantially along said antenna's beam, a signal processor for processing radar echo signals received through said antenna comprising:
   first means generating a radio frequency reference waveform;
   second means for sensing at least the rotation rate of said rotating tangential velocity vector;
   third means coupled to said second means and generating a Doppler reference waveform whose frequency matches the Doppler shift of radar echos received from an object when said tangential velocity vector points towards it;
   input means coupled to said first means and having a signal input terminal and a plurality of signal output terminals, said input terminal receiving said radar echo signals and said output terminals providing signals that represent combinations of differentially phase-shifted versions of said radio frequency reference waveform with said radar echo signals;
   range-gated filter means coupled to said third means, having a plurality of signal input terminals connected respectively to the output terminals of said input means, and having at least one output terminal, said range-gated filter functioning to select echos being received from objects within predetermined range limits and, by virtue of being located within a narrow cone coaxial with said tangential velocity vector, having a Doppler shift waveform substantially matching the said Doppler reference waveform; and
   output means coupled to said range-gated filter means, for indicating to an operator the presence of said selected echos whose amplitudes exceed a preestablished threshold level.

5. The radar according to claim 4 in which at least said antenna is affixed to a blade of a helicopter rotor, said axis of rotation being that of the helicopter rotor assembly.

6. The radar according to claim 5 in which said second means also senses the translational velocity of said helicopter relative to the terrain under it.

7. An obstacle detector for helicopters and the like having rotary blades, said detector comprising a pulsed Doppler radar constructed to have a pulse repetition frequency that is at least twice the Doppler frequency shift of a target that is stationary relative to the helicopter, said Doppler radar including a processor for received radar signals having a plurality of range channels and said radar further having a directional transmitting and receiving antenna mounted adjacent the outermost tip of one of said rotary blades so that the sensitive direction of said antenna is positioned generally parallel to the direction of movement of the outermost tip.

* * * * *